(12) United States Patent
Potulwar et al.

(10) Patent No.: US 12,285,690 B2
(45) Date of Patent: *Apr. 29, 2025

(54) METHODS FOR GENERATING AND VALIDATING GAMING MACHINE SUBSCRIPTION KEYS AND SECURING SUBSCRIPTION PARAMETER DATA AND JURISDICTION FILES

(71) Applicant: AGS LLC, Las Vegas, NV (US)

(72) Inventors: Shrikant Vasant Potulwar, Alpharetta, GA (US); Scott Andrew Melnick, Atlanta, GA (US); Jason Adam Cherkas, Dacula, GA (US); Anil Kumar Narra, Alpharetta, GA (US); Jack Dillon Cobb, Jr., Winder, GA (US); José Damián Rosario Ortega, Dacula, GA (US)

(73) Assignee: AGS LLC, Las Vegas, NV (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/504,083

(22) Filed: Oct. 18, 2021

(65) Prior Publication Data

US 2022/0032197 A1 Feb. 3, 2022

Related U.S. Application Data

(62) Division of application No. 15/854,050, filed on Dec. 26, 2017, now Pat. No. 11,148,059.

(Continued)

(51) Int. Cl.
*A63F 13/73* (2014.01)
*G06Q 20/12* (2012.01)
(Continued)

(52) U.S. Cl.
CPC ......... *A63F 13/73* (2014.09); *G06Q 20/1235* (2013.01); *G06Q 20/38215* (2013.01);
(Continued)

(58) Field of Classification Search
CPC .. G06Q 30/0645; G06Q 2220/18; A63F 13/73
See application file for complete search history.

(56) References Cited

U.S. PATENT DOCUMENTS 5,329,598 A * 7/1994 Geist .................... G06V 30/262
382/229
5,761,668 A * 6/1998 Adamchick ............... G06F 8/78
(Continued)

OTHER PUBLICATIONS

A. Eskicioglu and L. Litwin, "Cryptography," in IEEE Potentials, vol. 20, No. 1, pp. 36-38, Feb.-Mar. 2001, doi: 10.1109/45.913211. keywords: {Cryptography;Frequency;Military computing;Application software;National security;Information analysis;Writing;Information security;Resists; Standards development}.*

*Primary Examiner* — Steven S Kim
(74) *Attorney, Agent, or Firm* — Snell & Wilmer LLP

(57) ABSTRACT

Generating and validating a subscription key based on subscription parameters associated with a jurisdiction file stored in a NVRAM, the subscription key having characters based on a subscription start date, a subscription term, a key generation date, and a cyclical redundancy check value. Parameters are extracted from the subscription key including the subscription start date, the subscription term, the key generation date, and the cyclical redundancy check value and are stored in a memory of the gaming machine. The key is checked by generating a local cyclical redundancy check value based on a MAC address of the gaming machine and one or more of the extracted parameters, and is validated when the local cyclical redundancy check value matches the cyclical redundancy check value extracted from the sub- (Continued)

scription key. The jurisdiction file may be updated during a RAM clear function during installation of the gaming machine.

15 Claims, 22 Drawing Sheets

Related U.S. Application Data

(60) Provisional application No. 62/564,470, filed on Sep. 28, 2017.

(51) Int. Cl.
*G06Q 20/38* (2012.01)
*G07F 17/32* (2006.01)
*G06Q 20/10* (2012.01)
*G06Q 30/0645* (2023.01)
*G06Q 50/34* (2012.01)

(52) U.S. Cl.
CPC ......... *G07F 17/3227* (2013.01); *G06Q 20/10* (2013.01); *G06Q 30/0645* (2013.01); *G06Q 50/34* (2013.01); *G06Q 2220/18* (2013.01)

(56) References Cited

U.S. PATENT DOCUMENTS

| | | | |
|---|---|---|---|
| 5,892,900 A * | 4/1999 | Ginter | G06F 21/74 726/26 |
| 6,832,349 B1 | 12/2004 | Seamans | |
| 6,920,567 B1 * | 7/2005 | Doherty | G06F 21/105 713/168 |
| 7,106,845 B1 * | 9/2006 | Zhuk | G06F 21/32 379/189 |
| 7,383,545 B1 * | 6/2008 | Yoo | G06F 11/1417 713/1 |
| 7,921,059 B2 * | 4/2011 | Chicks | G06Q 20/3829 705/51 |
| 8,051,491 B1 * | 11/2011 | Cavage | H04L 63/0227 726/16 |
| 8,224,750 B1 * | 7/2012 | Bennett | G06Q 20/3829 705/51 |
| 8,996,422 B2 | 3/2015 | Suzuki et al. | |
| 2003/0163719 A1 | 8/2003 | Ebihara | |
| 2004/0054952 A1 | 3/2004 | Morrow et al. | |
| 2004/0066779 A1 * | 4/2004 | Barrack | H04L 69/22 370/389 |
| 2004/0128395 A1 | 7/2004 | Miyazaki | |
| 2004/0168111 A1 | 8/2004 | Arnold et al. | |
| 2005/0044546 A1 * | 2/2005 | Niebling | H04L 63/10 717/172 |
| 2005/0086173 A1 * | 4/2005 | Kalwit | G06F 21/10 705/59 |
| 2005/0091511 A1 * | 4/2005 | Nave | H04L 67/34 713/185 |
| 2005/0215325 A1 | 9/2005 | Nguyen et al. | |
| 2006/0035713 A1 | 2/2006 | Cockerille et al. | |
| 2006/0050688 A1 | 3/2006 | Panagopoulos et al. | |
| 2006/0075182 A1 * | 4/2006 | Hsieh | G06F 3/0605 711/100 |
| 2006/0098666 A1 | 5/2006 | Francis Conde Powell | |
| 2006/0174346 A1 | 8/2006 | Carroll et al. | |
| 2007/0060302 A1 | 3/2007 | Fabbri | |
| 2007/0099698 A1 | 5/2007 | Cole | |
| 2008/0281625 A1 | 11/2008 | Shiki | |
| 2009/0089881 A1 | 4/2009 | Indenbom | |
| 2009/0150865 A1 | 6/2009 | Young et al. | |
| 2014/0032318 A1 * | 1/2014 | Hopwood | G06Q 30/02 705/14.53 |
| 2014/0115101 A1 * | 4/2014 | Wittner | H04L 67/10 709/217 |
| 2014/0173581 A1 * | 6/2014 | Grinberg | G06F 8/654 717/172 |
| 2014/0274364 A1 | 9/2014 | Caldas et al. | |
| 2015/0018089 A1 | 1/2015 | Caldas | |
| 2015/0020069 A1 * | 1/2015 | Patani | G06F 9/45533 718/1 |
| 2015/0119134 A1 | 4/2015 | Burke et al. | |
| 2015/0242618 A1 | 8/2015 | Itskov | |
| 2015/0336005 A1 | 11/2015 | Melnick et al. | |
| 2016/0063873 A1 | 3/2016 | Zimmer et al. | |
| 2016/0357948 A1 * | 12/2016 | Takeuchi | G06F 21/105 |
| 2017/0054562 A1 | 2/2017 | Cooper et al. | |

* cited by examiner

METHODS FOR GENERATING AND VALIDATING GAMING MACHINE SUBSCRIPTION KEYS AND SECURING SUBSCRIPTION PARAMETER DATA AND JURISDICTION FILES

RELATED APPLICATION DATA

This application is a divisional of U.S. application Ser. No. 15/854,050, filed Dec. 26, 2017, which claims priority to U.S. Provisional Application Ser. No. 62/564,470, filed Sep. 28, 2017. The contents of these prior applications are incorporated herein by reference in their entirety.

BACKGROUND

The disclosed embodiments relate to methods of presenting games and gaming machines configured to present games, and more specifically to methods of generating and controlling subscription keys for presenting games and systems configured to generate subscription keys.

Many styles of gaming machines and games are known, including casual (or non-wagering) gaming and wager-based gaming. Many establishments that offer games on site, such as casinos, restaurants, stores, etc. prefer to have a variety of different games and gaming devices available for customers to play. However, gaming machines may be very costly, and so an ability of a gaming establishment to purchase several different gaming machines may be limited.

Because of this, gaming machine manufacturers and gaming establishments may enter into contracts where instead of the gaming establishment purchasing a gaming machine, the manufacturer and the gaming establishment may share revenue from a machine placed at the gaming establishment. Other arrangements such as lease agreements, rental agreements, etc. may be used to allow the establishment access to the gaming machines without an outright purchase of the machine.

In such arrangements, it is important for the gaming manufacturer to be able to control access to the games on the gaming machines to ensure that revenue sharing, lease payments, or rental payments are made according to contract. Various software licensing methods have been developed to control software of a gaming machine to conform with contracts between manufacturers and gaming establishments. However, even with such methods, it is tedious and difficult to keep track of the various contract types and lengths, as well as which machines are covered by which contracts. Furthermore, gaming machine manufactures also must guard against copying of gaming software, attempted modifications to gaming machines to work around access control, and other means utilized by certain parties seeking to tamper with or alter gaming machine software. These problems become compounded where multiple gaming machines are operated at multiple locations, as such may require the machines to have different configurations and because technology commonly makes it easy for software to be pirated and copied.

Accordingly, a system and method for controlling subscriptions to gaming machines is desired.

SUMMARY

In view of the above, embodiments for generating and validating a subscription key have been developed. These systems and methods for generating and validating a subscription key provide a unique, technical solution to the above-described problems of controlling the operation of a gaming machine and/or the presentation of one or more games at the gaming machine. The subscription key may have characters based on a subscription start date, a subscription term, a key generation date, and a cyclical redundancy check value. During a validation process, parameters are extracted from the subscription key including the subscription start date, the subscription term, the key generation date, and the cyclical redundancy check value and are stored in a memory of the gaming machine. The key is checked by generating a local cyclical redundancy check value based on a MAC address of the gaming machine and one or more of the extracted parameters, and is validated when the local cyclical redundancy check value matches the cyclical redundancy check value extracted from the subscription key.

The gaming machine may be configured to set a counter based on the subscription term and to decrement the counter based on a predetermined time interval. The gaming machine may be disabled when the counter reaches a zero value. When the counter reaches zero, the gaming machine may force a cashout of credits maintained at the gaming machine prior to disabling the gaming machine. In some instances, the gaming machine may display a remaining time on a gaming machine display based on the counter.

The gaming machine may further be configured to receive a second subscription key via the input device, the second subscription key comprising a start date after the subscription term of subscription key expires. The gaming machine may store the second subscription key in the memory as a future subscription key. In some embodiments, the subscription key is a hexadecimal string.

In further embodiments, a method of generating a subscription key for a gaming machine at a web server is provided. The method includes receiving a first input for a subscription start date and outputting a first string based on the subscription start date, receiving a second input for a subscription term and outputting a second string based on the subscription term, receiving a third input for a key generation date and time and outputting a third string based on the key generation date and time, and receiving a fourth input with a MAC address of the gaming machine and outputting a fourth string based at least in part on the MAC address. An initial subscription key may be generated including the characters of the first, second, third, and fourth strings.

In further embodiments, a final subscription key is generated by scrambling the initial subscription key. For example, the characters are scrambled by selecting increments of two characters of the initial subscription key.

The first, second, third, and fourth strings may be hexadecimal strings. For example, the first string is a four-digit hexadecimal string representing a day of year and a two-digit year value based on the subscription start date, the second string is a four-digit hexadecimal string representing a number of days based on the subscription term, the third string is a six-digit hexadecimal string representing a day of year followed by the hours and minutes of the key generation date and time, and the fourth string is a four-digit hexadecimal string that is based on the subscription start date, the subscription term, and a pre-coded secret string to generate a cyclical redundancy check value.

Other aspects of the invention comprise methods and configurations for storing subscription parameters and/or jurisdictional files for a gaming machine. In one embodiment, a jurisdictional file may be stored in a read-only memory of the gaming machine, such as an NVRAM, a separate compact flash memory or the like. The jurisdictional file may include subscription parameters. In one embodiment, the jurisdiction file may be updated during a RAM clear function, such as at installation of the gaming machine, whereby once installed the file is secured in a tamper-proof memory of the gaming machine.

Further objects, features, and advantages of the present invention over the prior art will become apparent from the detailed description of the drawings which follows, when considered with the attached figures.

DETAILED DESCRIPTION OF EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise methods of presenting games and controlling access to games on gaming machines and gaming systems. In a preferred embodiment, the methods of presentation are implemented via a gaming machine or gaming system. Such a gaming machine may have various configurations.

The gaming machine may be located at a casino (and as such may be referred to as a "casino gaming machine"). As described below, the gaming machine may be part of a gaming system, such as a casino gaming system which links two or more of the gaming machines or one or more gaming machines with other devices, such as one or more table games, kiosks, accounting systems or servers, progressive systems or servers, player tracking systems or servers, or the like.

Figure 1A:
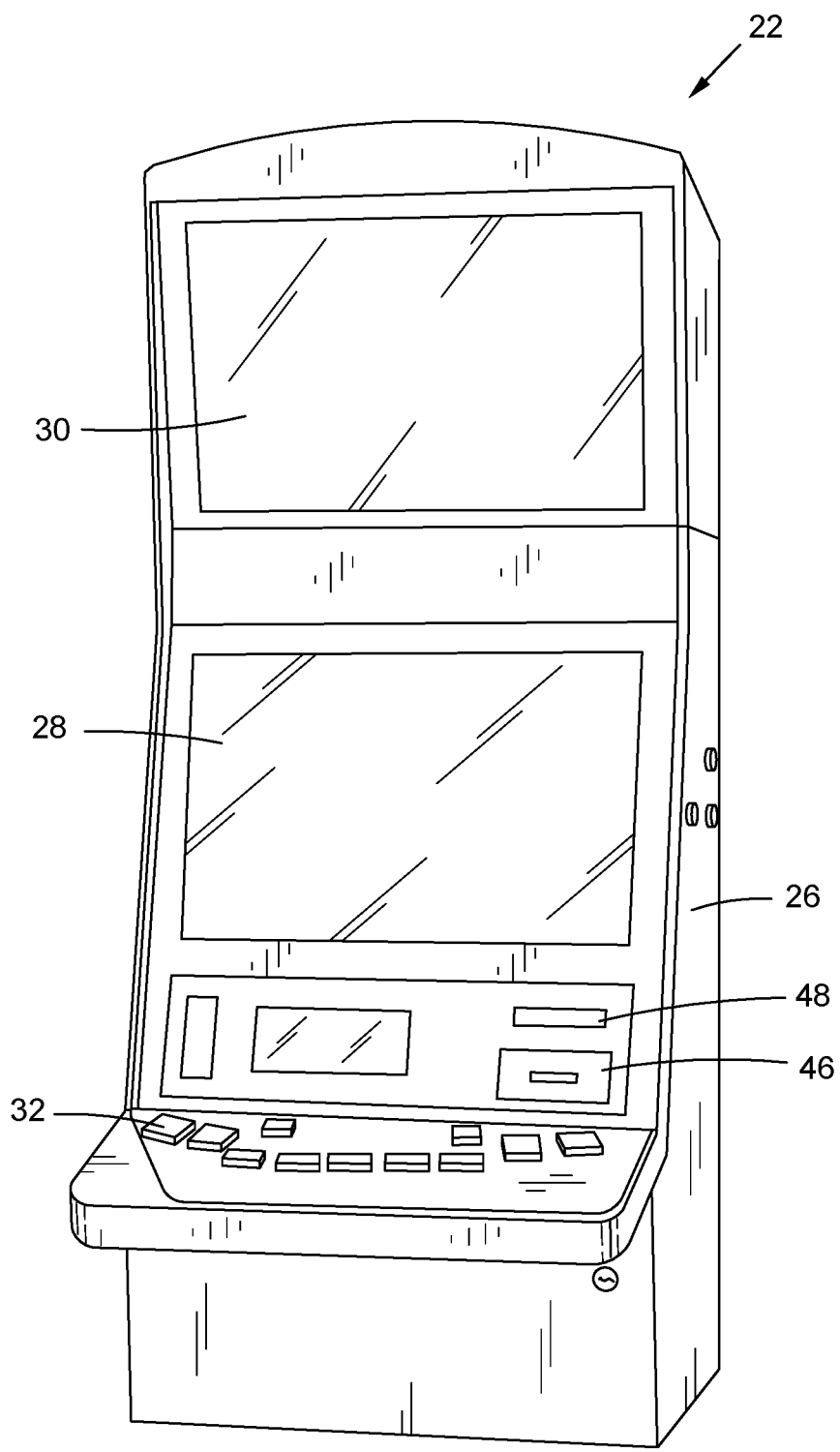
FIG. 1A is a perspective view of one embodiment of a gaming machine.

One configuration of a gaming machine 22 is illustrated in FIG. 1A. As illustrated, the gaming machine 22 generally comprises a housing or cabinet 26 for supporting and/or enclosing various components required for operation of the gaming machine. In the embodiment illustrated, the housing 26 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type, "bar-top" or other configuration as is well known to those of skill in the art).

The gaming machine 22 preferably includes at least one first display device 28 configured to display game information. The display device 28 may comprise an electronic video display such as a cathode ray tube (CRT), high resolution flat panel liquid crystal display (LCD), projection LCD, plasma display, field emission display, digital micromirror display (DMD), digital light processing display (DLP), LCD touchscreen, a light emitting display (LED) or other suitable displays now known or later developed, in a variety of resolutions, sizes and formats (e.g. 4:3, widescreen or the like). The display device 28 may be capable of projecting or displaying a wide variety of information, including images, symbols and other indicia or information associated with game play, game promotion or other events. The gaming machine 22 might include more than one display device, such as a main or first display device 28 and a secondary display device 30. The two or more display devices might be associated with the housing or, as illustrated in FIG. 1A, the gaming machine 22 might also include a top box or other portion which includes the one or more second display devices 30. Also, the gaming machine 22 might include side displays (such as mounted to the exterior of the housing 26) and might include multiple displays of differing sizes.

While the display devices may comprise one or more video displays, in another embodiment, the gaming machine 22 may include one or more physical reels capable of displaying game information, such as slot symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. The principal of such an arrangement is described in U.S. Pat. No. 4,448,419 to Telnaes, which is incorporated herein by reference.

As described in more detail below, the gaming machine 22 is preferably configured to present one or more games upon a player making a monetary payment or wager. In this regard, as described in more detail below, the gaming machine 22 includes mechanism or means for accepting monetary value.

In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. As detailed below, the gaming machine 22 preferably includes a mechanism or means for returning unused monetary funds and/or dispensing winnings to a player.

The gaming machine 22 preferably includes one or more player input devices 32 (such as input buttons, plunger mechanisms, a touch-screen display, joystick, touch-pad or the like). These one or more input devices 32 may be utilized by the player to facilitate game play, such as by providing input or instruction to the gaming machine 22. For example, such input devices 32 may be utilized by a player to place a wager, cause the gaming machine 22 to initiate a game, to initiate a reel spin, to "cash out" of the gaming machine, or to provide various other inputs. Input devices 32 may further be utilized by a game attendant or administrator to check a status of a subscription key, to remove a subscription key, or to add a new subscription key, as explained in further detail below.

Figure 1B:
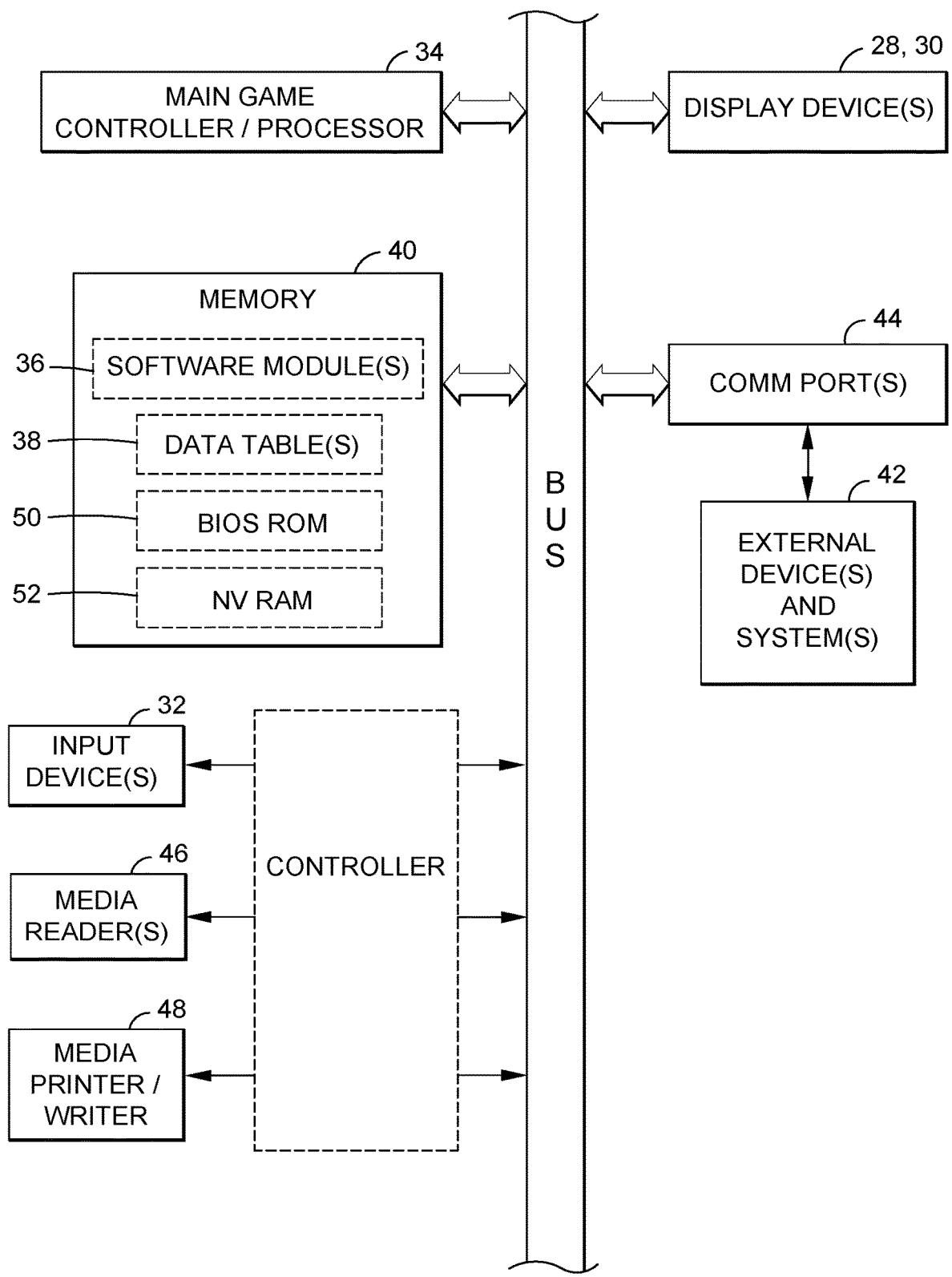
FIG. 1B diagrammatically illustrates a configuration of the gaming machine illustrated in FIG. 1A.

Referring to FIG. 1B, in one preferred embodiment, the gaming machine 22 includes at least one microprocessor or controller 34 for controlling the gaming machine, including receiving player input and sending output signals for controlling the various components or peripheral devices of the machine 22 (such as generating game information for display by the display devices 28,30). The controller 34 may be arranged to receive information regarding funds provided by a player to the gaming machine 22, receive input such as a purchase/bet signal when a purchase/bet button is depressed, and receive other inputs from a player. The controller may be arranged to generate information regarding a game, such as generating game information for display by the at least one display device 28, 30 (such as information comprising slot game symbols and generated multipliers), for determining winning or losing game outcomes and for displaying information regarding awards for winning game outcomes, and for validating game subscriptions, among other things.

The controller 34 may be configured to execute machine readable code or "software" or otherwise process information, such as obtained from a remote server. Software 36 or other instructions may be stored at a memory or data storage device 40, e.g. in a fixed or non-transitory configuration. The memory 40 may also store other information or data, such as data stored in table or other forms (including, but not limited to look-up tables, pay tables and other information including tracked game play information). The gaming machine 22 may also include one or more random number generators for generating random numbers (such as implemented by a random number generator software module stored in the memory 40 and executable by the processor 34), such as for use in selecting slot symbols, multiplier values, and for presenting the game in a random fashion (e.g. whereby the game is presented in a manner in which the player cannot control the outcome) or pseudo-random fashion (e.g. such as where the game includes a skill component which can affect the outcome of the game).

As described in more detail below, as illustrated in FIG. 1B, the memory 40 of the gaming machine 22 may include a BIOS, such as stored in a BIOS ROM 50. The BIOS may comprise firmware used by the controller perform hardware initialization and runtime services for an operating system of the gaming machine 22. The gaming machine 22 preferably also includes at least one NVRAM 52, such as for storing one or more subscription keys as described below.

Preferably, the controller 34 is configured to execute machine readable code or instructions (e.g. software) which are configured to implement the game. In this regard, the gaming machine 22 is specially configured to present the game of the invention via specific software and/or hardware which causes the gaming machine to operate uniquely. For example, the controller 34 of the gaming machine 22 may be configured to detect a wager, such as a signal from a player's depressing of the "bet one" button which comprises one of the input devices 32. Upon such an event and/or the player otherwise signaling the gaming machine to present the game, the controller may be configured to cause the at least one display 28 to display unique information, such as a unique graphical interface or unique game display, including game symbols or other game information. The controller may accept input from a player of game inputs, such as a request to spin reels or the like, via the one or more player input devices of the gaming machine 22. As indicated above, the machine-readable code may be configured in various manners, such as by having various "modules" of software which are designed to implement specific features of the game play or game presentation.

The gaming machine 22 may be configured to generate and present games in a stand-alone manner or it may be in communication with one or more external devices or systems 42 at one or more times. The gaming machine 22 might communicate with one or more of such external devices or systems 42 via one or more communication ports 44 or other interface devices. These ports or interface devices 44 may be configured to implement various communication protocols (including proprietary protocols) and communicate via wireless, wired or other communication link. For example, the gaming machine 22 may be configured as a server based device and obtain game code or game outcome information from a remote game server (in which event the gaming machine controller may receive game information from the server, such as game outcome information, and use that server-generated information to present the game at the gaming machine). For example, the gaming machine 22 might be configured as a stand-alone device or as a server-based device for presenting games as Class III games (as defined by the U.S. Indian Gaming Regulatory Act) or as a server-based device for presenting games as Class II games (as defined by the U.S. Indian Gaming Regulatory Act).

As indicated, the gaming machine 22 is configured to present one or more wagering games. The gaming machines 22 is preferably configured to accept value, such as in the form of coins, tokens, paper currency or other elements or devices representing value such as monetary funds. Thus, as indicated above, the gaming machine 22 preferably includes a mechanism or means for accepting monetary value. For example, the gaming machine 22 might include a coin acceptor for accepting coins. Of course, associated coin reading/verifying devices and coin storage devices may be associated with the gaming machine 22 if it is configured to accept coins. Likewise, as illustrated in FIGS. 1A and 1B, the gaming machine 22 might include a media reader 46. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read fobs, magnetic stripe cards, or other media having data associated therewith and via which value or funds may be associated with the gaming machine 22. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications, such as to enable the transfer of funds from the player to the gaming machine or system.

When the player associates funds with the gaming machine or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiment, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. These winnings may be associated with the player's credit balance, thus increasing the player's credit balance.

In one embodiment, the player may provide an input to the gaming machine 22 to indicate their desire to cash out, such as by selecting a "cash out" button or touch screen feature or providing other input. In response, a monetary value represented by the player's credit balance or the like is preferably paid, transferred or otherwise provided to the player. For example, upon an award or at cash-out, associated funds may be paid to the player by the gaming machine 22 dispensing coins to a coin tray. In another embodiment, funds may be issued by dispensing paper currency or other media. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine. In this regard, the gaming machine 22 may include one or more media printers or writers 48. In other embodiments, the cash-out mechanism may result in the funds value being transferred to an external device or account, such as a player's casino account (such as associated with a casino server), a remote bank or other financial account, or an electronic device such as a player's phone, PDA or tablet.

The gaming machine 22 may also include a player tracking device, such as a card reader and/or an associated keypad or other input device (such as a touch screen display). Such player tracking devices are well known and may permit the game operator to track play of players of the gaming machine. The tracked play may be utilized to offer player bonuses or awards.

As illustrated in FIG. 1B, the main game controller or processor 34 may communicate with several of the peripheral devices via one or more intermediary controllers. For example, some of the peripheral devices might comprise USB type or enabled devices which are controlled by an intermediary USB controller.

A casino may have numerous such gaming machines 22, such as located on a casino floor or in other locations. Of course, such gaming machines 22 might be used in other environments, such as an airport, a bar or tavern or other locations.

It will be appreciated that the gaming machine illustrated in FIGS. 1A and 1B is only exemplary of one embodiment of a gaming machine. For example, it is possible to for the gaming machine to have various other configurations, including different shapes and styles and having different components than as just described.

The gaming machine 22 may, as noted above, be part of a system which includes other devices. For example, the gaming machine 22 may communicate with one or more casino systems, such as a player tracking server or system, an accounting system or server, a ticketing system, a bonusing system, a tournament system, other gaming machines, and external devices.

To control access to or operation of the gaming machine or one or more games on a gaming machine, an enabling key is generated to validate the machine. This allows gaming manufacturers to ensure that revenue sharing, lease payments, and other contract terms are met with respect to the one or more games on the gaming machine. To ensure that the subscription is valid, the key is generated with an expiration date and/or other subscription information embedded in the key itself. In this way, the gaming machine and/or the one or more games on the gaming machine can be disabled forcing the operator to update the subscription with a new key to enable the gaming machine and/or the one or more games.

The key generation and implementation may be operated on a secure web service. A gaming establishment may access keys for gaming machines on site through a web browser, a web-based mobile application, or the like.

Figure 2:
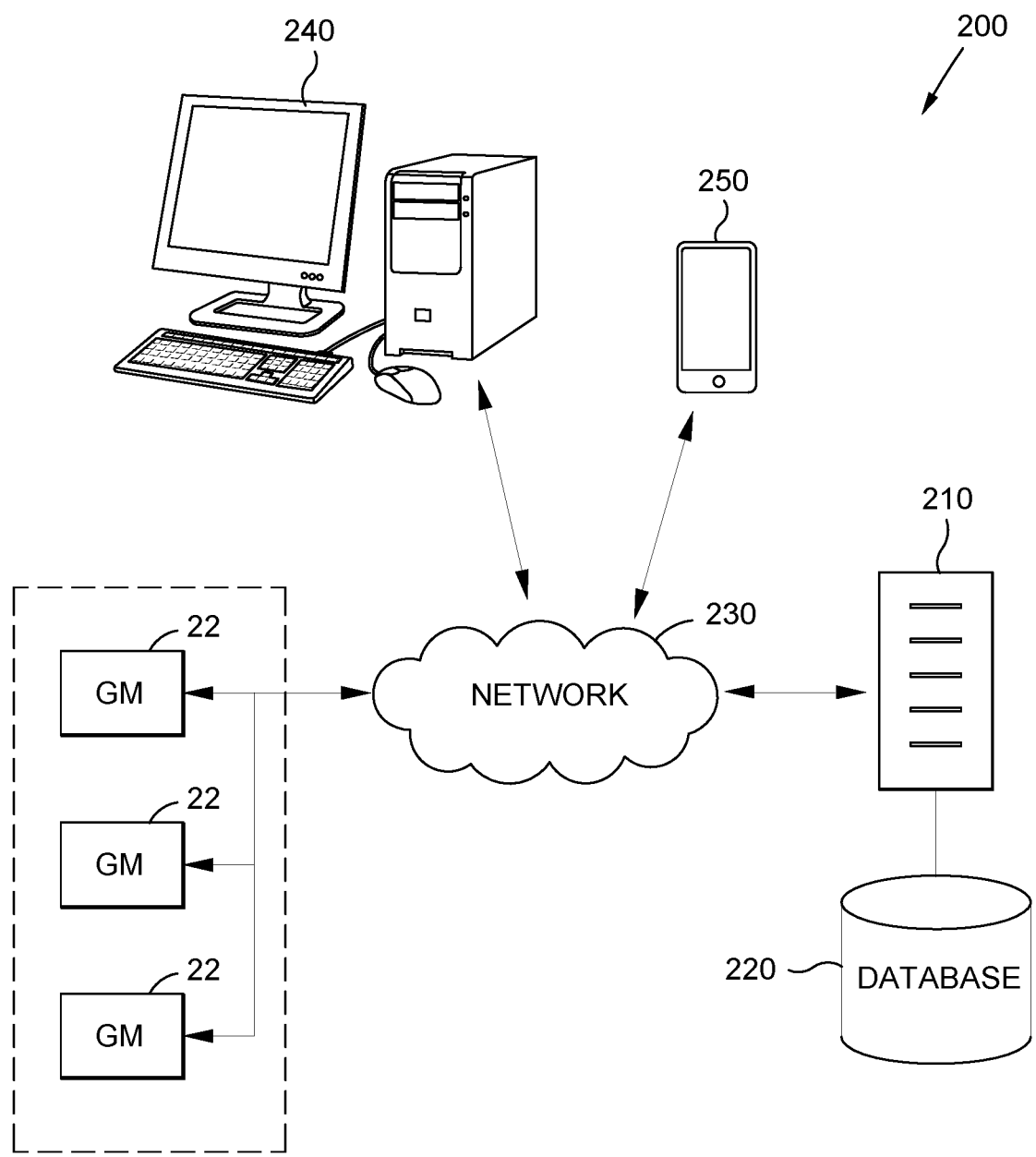
FIG. 2 diagrammatically illustrates a gaming system, according to one exemplary embodiment.

In one embodiment, as illustrated in FIG. 2, a gaming system 200 comprises at least one server 210 and a plurality of gaming machines 22. The server 210 may comprise, for example, at least one controller, a memory for storing machine-readable code or software for use in implementing features of the invention, a database 220 for storing data such as tournament data, and one or more communication interfaces, such as for allowing information to be exchanged with the gaming machines 22, and one or more user interface devices (such as a user interface station, not shown). In this configuration, the gaming machines 22 and server 110 may communicate, such as over one or more communication links (such links may be wired, wireless or a combination thereof and may include, as illustrated, the Internet or other networks such as LANs, WANs or the like). As described, in one embodiment, the server 210 may be configured as a web server which is accessible over the Internet 230, thus permitting communications between the gaming machines 22 and the server 110, but also other user devices such as computers 240, mobile communication devices 250 and the like.

In one embodiment, key generation and implementation is facilitated by the server 210, such as by a subscription generation tool which comprises machine-readable code which is stored in a memory associated with the server 110 and executed by the processor thereof. As indicated, an operator might initiate a key generation sequence via a key request which is made via one of the gaming machines 22, or via a computer 240 or mobile communications device 250. As one example, an operator might run a web-based application on their mobile communications device 250. This application may communicate with the server 110 to request a key from the server, which then triggers the key generation process or the transmission of a pre-generated and stored key to the operator. As described below, the operator may then provide the key to the gaming machine 22. The subscription key may be a hexadecimal string. In this embodiment, the hexadecimal string may have a length of 18 characters.

The key not only provides access to the game for the gaming establishment, but includes built in data to control access. The key comprises a gaming machine media access control address ("MAC address"), the number of days that a subscription key is valid, a start date of the subscription, and a key generation date and time.

Figure 3:
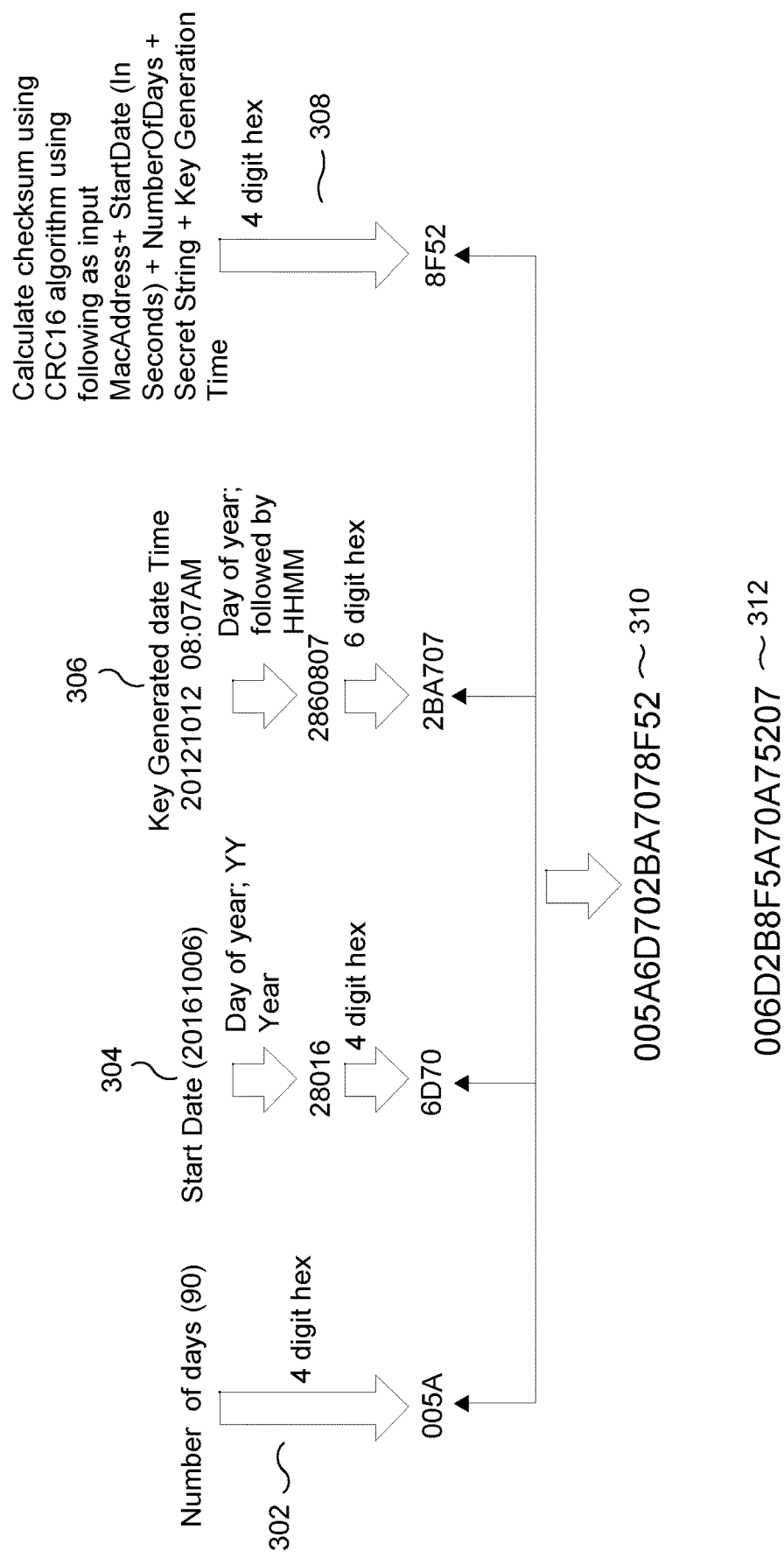
FIG. 3 is a diagram of a key generation tool according to one exemplary embodiment.

FIG. 3 is a diagram of a key generation tool according to one exemplary embodiment. As mentioned above, the key generation tool may be operated on a secured web server, such as server 210 (FIG. 2). Also, as mentioned previously, the key generation tool may generate a subscription key to control access to a gaming machine and/or one or more games on a gaming machine. As shown in FIG. 3, the key generation tool takes a first input 302 of a number of days that the subscription key is valid. The number of days is converted into four-digit hexadecimal, or a two-byte hexadecimal value. In one example shown in FIG. 3, the number of days the subscription is valid is 90, and the key generation tool converts this to 005A. The first input 302 may be manually input by a gaming manufacturer, a gaming establishment, or may be automatically inserted by the system referencing a contract look-up table, or the like.

The second input 304 is a start date of the subscription. In one example, the start date must be input in a specific format, such as YYYMMDD. The key generation tool converts the start date to a day of the year followed by a 2-digit year value, and converts this to a four-digit, two-byte hexadecimal value. In one example shown in FIG. 3, the start date is Oct. 6, 2016 which is input to the key generation tool as 20161006. The key generation tool converts the start date to 28016 (where October 6 is the $280^{th}$ day of the year 2016). This value is then converted to hexadecimal value of 6D70. The second input may be manually input by a gaming manufacturer, a gaming establishment, or may be automatically inserted by the system referencing a contract look-up table, or the like.

The third input 306 is the date and time when the key is generated. In one example, the date and time must be input in a specific format, such as YYYYMMDD HH:MM. The third input 306 is converted to the day of the year followed by hour and minutes. This value is then converted to a six-digit hexadecimal value. In the example shown in FIG. 3, the generated date and time is Oct. 12, 2016 at 8:07 AM. This is input as 20161012 08:07 AM. This is converted to the value 2860807 (where October 12 is the $286^{th}$ day of the year 2016 and the time 8:17 is input as 0807). This value is converted to the six-digit hexadecimal value of 2BA707. The third input is generated automatically by the key generation tool based on the current time when the key is being generated.

The fourth input 308 is a calculated value based on several factors. One of these is the MAC address of the gaming machine which may be input manually or automatically to the key generation tool. The fourth input is performed using a cyclical redundancy check algorithm, such as CRC-16 algorithm, which is defined in standard SAS protocol manuals. The CRC-16 algorithm uses the MAC address, the start date used in the second input 304, the number of days used in the first input 302, a secret string hard coded in the software, and a seed hard coded in the software to calculate the fourth input 308. The result of the check sum algorithm is a four-digit hexadecimal value.

Using each of the resulting values from the four inputs, 302, 304, 306, and 308, an eighteen-digit initial key 310 is created. In this example shown in FIG. 3, the initial key is 005A6D702BA7078F52. To create a final key 312, the order of the characters may be scrambled. For example, the initial key is rearranged by taking two alpha numeric letters at a time. That is, the first two characters are added, the second two are skipped, the third two are added, etc. After this pattern reaches the end of the initial key, the skipped characters are placed after the added characters. In the example shown in FIG. 3, the final key 312 is 006D2B8F5A70A75207.

The final key 312 is communicated to a gaming establishment for validation at the gaming machine. This may be done via an application, a web browser, or the like operated by the gaming establishment to access the web server. In some embodiments, the final key 312 may be communicated directly to the gaming machine.

The secure web server, such as server 210 may store the created key and associates subscription information in a database, such as database 220 (FIG. 2). In this manner, the key may be associated with subscription data for the gaming machine. Further, should the key be requested again later by the gaming establishment, the key may simply be retrieved from the database instead of being regenerated. The database may also correlate the key and subscription information with information concerning the subscriber, such as the gaming establishment, or other information.

In some embodiments, multiple keys for a single gaming machine may be created. For example, there may be a current key and a future key loaded onto a gaming machine.

In some embodiments, when a subscription is renewed and a new subscription key is provided at the gaming machine, only the number of days on the keys will be updated, while the subscription start date remains unchanged. If there is a gap in subscription renewal (e.g. if the subscription start date for renewal is after a current subscription expires) then the renewal key is considered a future key. When a future key is entered after key validation, it is stored to be installed automatically when a current key expires.

Figure 4:
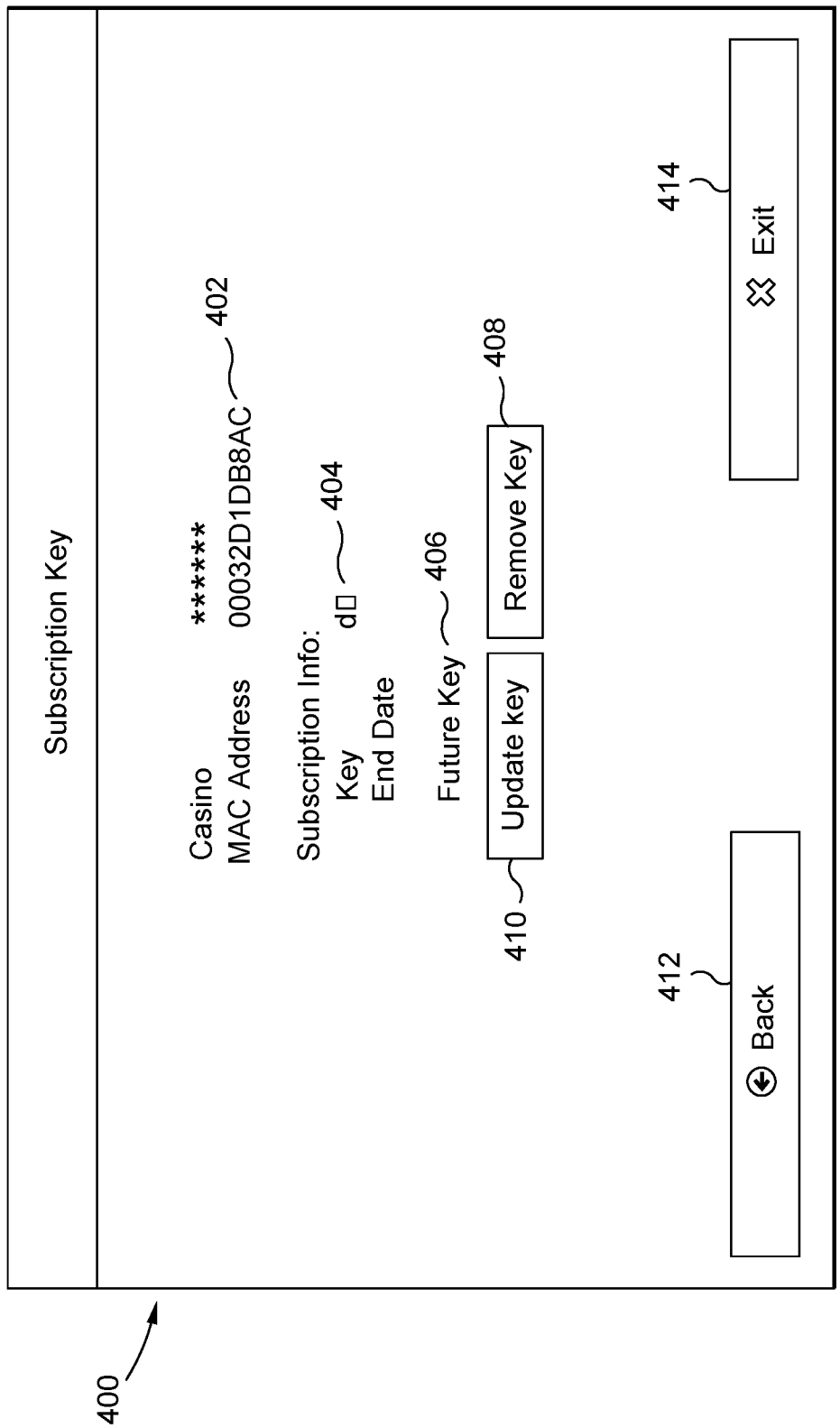
FIG. 4 shows a graphical user interface of an electronic player station where NVRAM comprises garbage data.

FIG. 4 shows a graphical user interface of an electronic player station. In FIG. 4, a graphical user interface ("GUI") 400 may be represented on a display screen. The GUI 400 may be enabled and controlled by software running on the gaming machine. In other embodiments, the GUI 400 is generated by information received from a server connected to the gaming machine. The GUI 400 comprises gaming machine information 402 such as the MAC address, the casino name, and the like. Subscription key information 404 is also displayed along with any future key information 406. Interface 408 may be used to remove a key from the gaming machine, while interface 410 may be used to update or add a key to the gaming machine. Other interfaces 412, 414 of the GUI 400 allow navigation to a previous screen or to exit out of the GUI, for example, to return to a game play interface.

In some embodiments, the subscription key is stored in the non-volatile, random access memory ("NVRAM") 52 (see FIG. 1B) of the gaming machine. For example, the subscription key may be stored in the first 512 block in NVRAM which is typically protected from standard memory clearing functionality. This allows the subscription service to implemented on a standalone gaming machine while protecting the subscription key from data modification and removal.

Because the subscription key may be stored in NVRAM that is protected from clearing functionality, it is possible that garbage data is stored in the NVRAM allocated for the subscription key. An example of garbage data is shown in the GUI 400 shown in FIG. 4. There, random characters are shown in the key information 406. The user may thus use the interfaces 408 or 410 to remove the garbage data or replace the garbage data with a valid subscription key. In other embodiments, the only way to clear any subscription data requires a password from the web server to remove data from the subscription portion of the NVRAM. For example, a password may be a five-digit password that expires after one day. If the password is entered into the gaming machine within the allotted valid time, then the subscription data may be reset.

The portion of NVRAM allocated for the subscription key may be a specific block used by a secure BIOS, such as BIOS ROM 50 (FIG. 2). For example, the data may be stored in 128 bytes of a first 512 block of NVRAM. The subscription data stored may include the following data:

TABLE 1

| Parameter | Bytes | Parameter Description |
| --- | --- | --- |
| Key | 18 | This Parameter may store a current key that is installed on a gaming machine. |
| Counter (Number of Days) | 4 | This Parameter may store a number of days remaining before a subscription expires. |
| Counter Update Date Time | 4 | This parameter may store a last time a counter was updated to ensure the counter is |

TABLE 1-continued

| Parameter | Bytes | Parameter Description |
| --- | --- | --- |
| | | decremented every end of day. |
| Subscription Start Date | 4 | This parameter may store start date of an installed key subscription. |
| Subscription End Date | 4 | This parameter will store start end date of installed key subscription |
| Key Generated Date Time | 4 | This parameter will store date time when installed key was generated |
| Future Key | 18 | This Parameter will store future key that's installed before current key is expired. |
| Future Counter (Number Of Days) | 4 | This Parameter will store number of days of subscription. |

Figure 5:
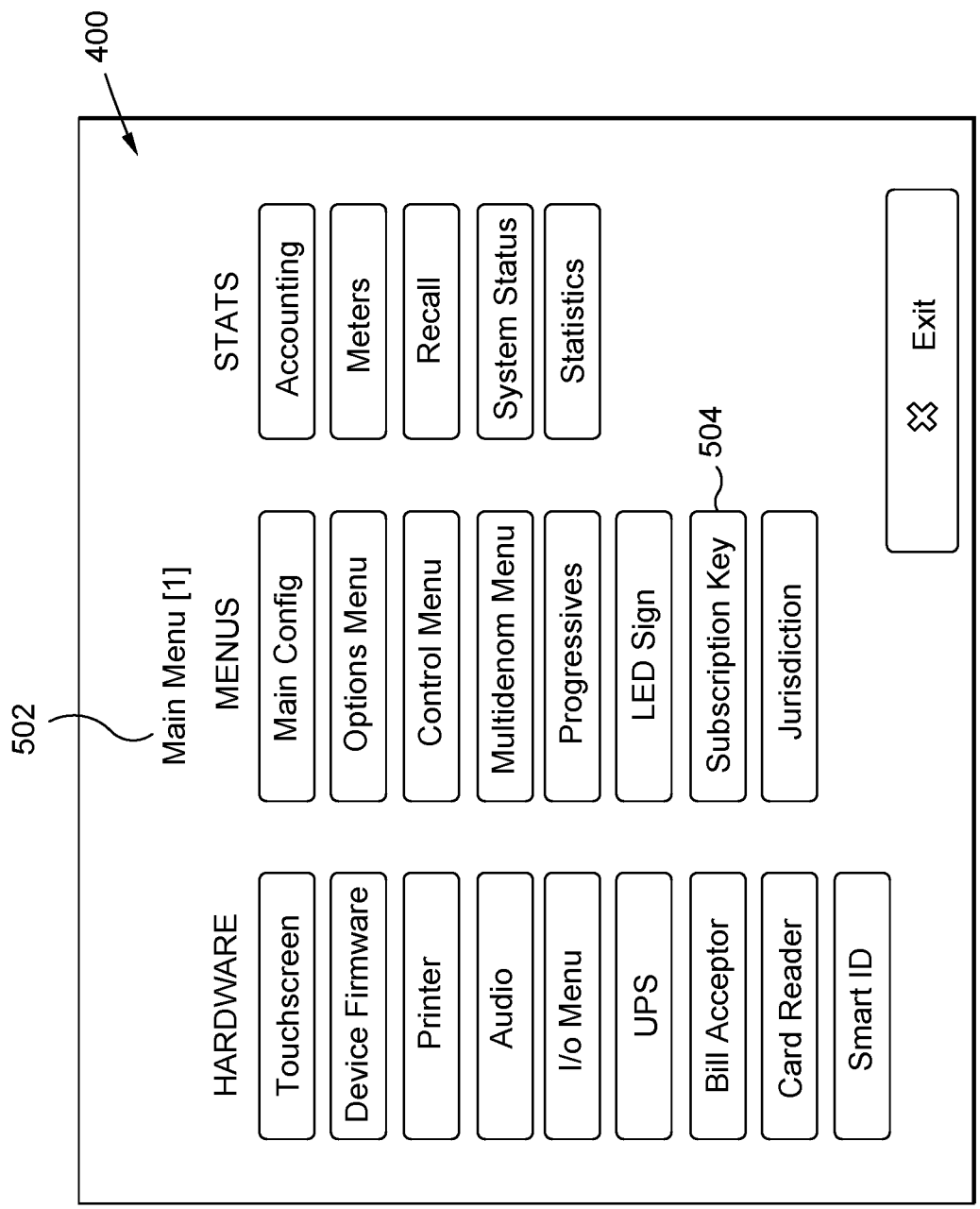
FIG. 5 shows a graphical user interface of an electronic player station with a menu.

FIG. 5 shows a graphical user interface of an electronic player station with a menu. A gaming establishment operator may access subscription information, such as to install or update a subscription key, and thus the gaming machine may include an administration menu 502 in the GUI 400. This allows the operator to access menu or data relating to various hardware, gaming machine statistics, etc. Also, in this instance, there is a subscription key option 504 to access, install, and/or update subscription key information.

Figure 6:
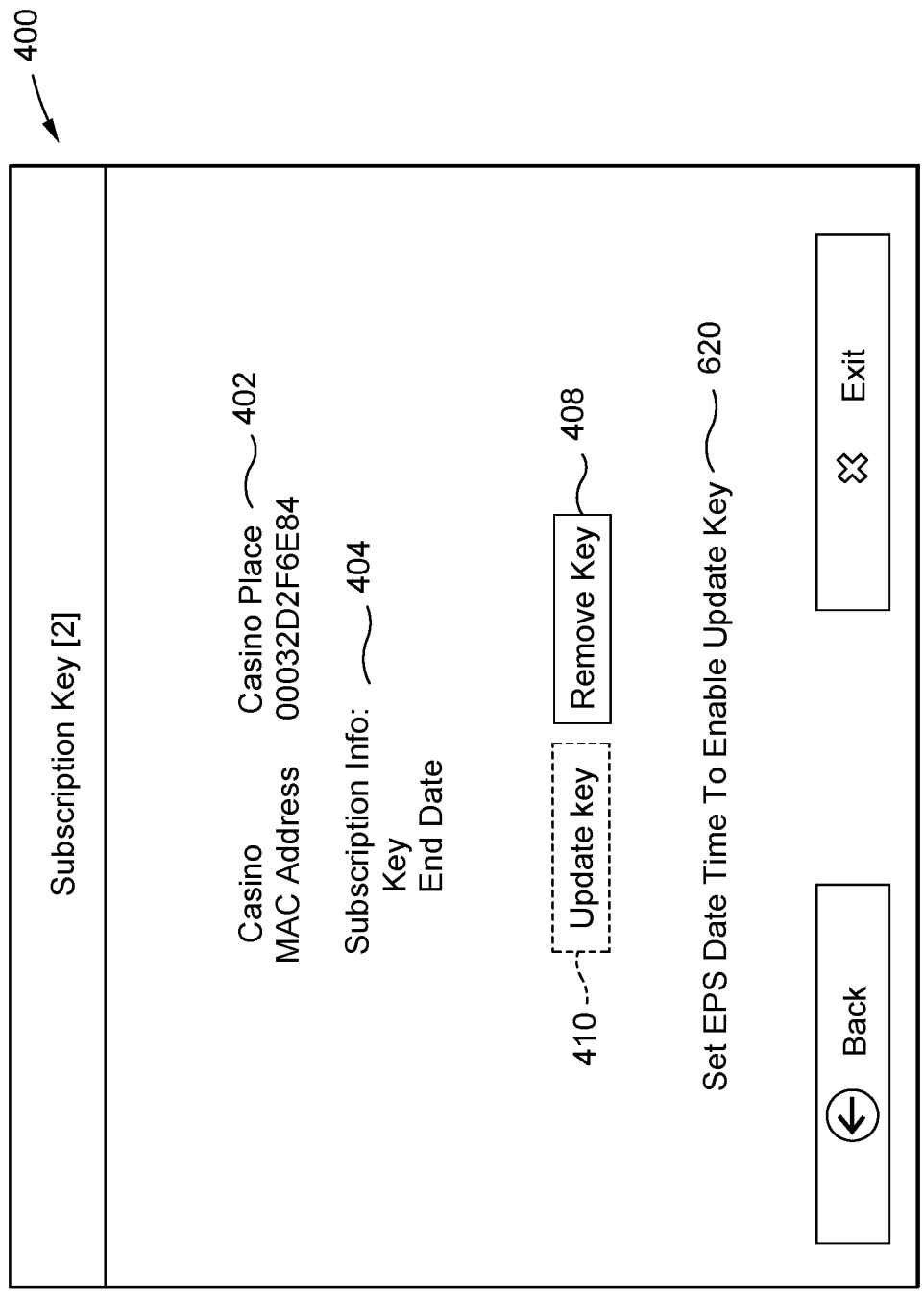
FIG. 6 shows a graphical user interface of an electronic player station when an electronic player station time is not set.

When an operator chooses the subscription key option 504, the gaming machine checks to see whether a subscription key may be entered or updated on the gaming machine. For example, to ensure that a subscription key is current, software controlling the subscription service on the gaming machine may initiate a check verifying that the date and time on the gaming machine are set. If not, the option for entering a subscription key may be disabled until the time and date are set. As shown in FIG. 6, the GUI 400 may show a warning 620 that the gaming machine date and time must be enabled to use the subscription key. Additionally, the update key interface 410 may be disabled until the warning 620 is mitigated.

Upon selection of the subscription key option 504 (FIG. 5), the GUI 400 will also show whether subscription data 404 is present in the NVRAM. When there is no data, the subscription data 404 shows blank, such as in the example in FIG. 6.

Figure 7:
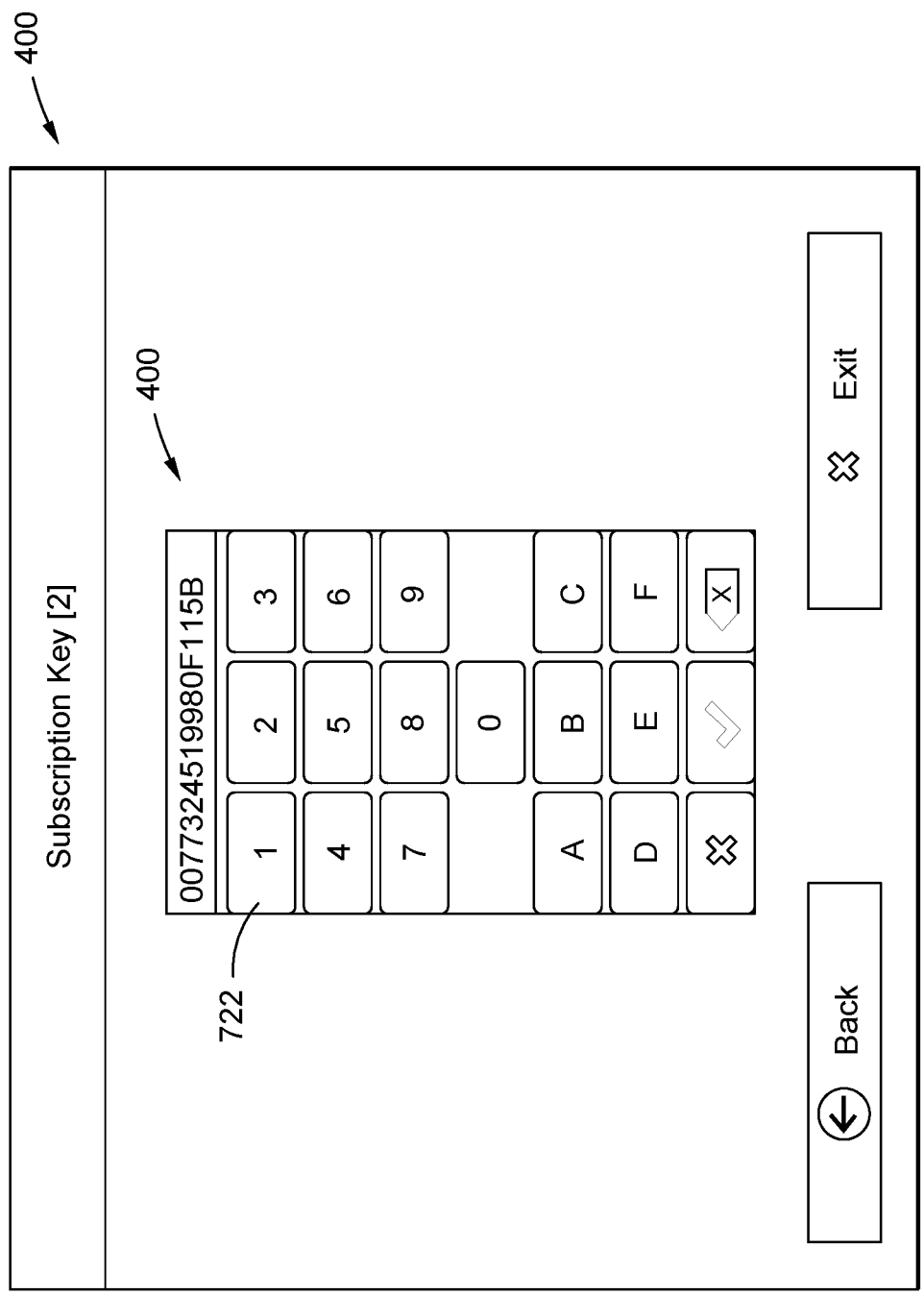
FIG. 7 shows a graphical user interface of an electronic player station with a hex keypad.

When it is determined that a new or updated subscription key may entered, the GUI 400 may be provided with a hexadecimal keypad 722, as shown in FIG. 7. The keypad 722 allows the operator to easily input the subscription key into the gaming machine to validate the subscription key. As explained above, the subscription key may be requested by the operator via a mobile device or computer running a mobile application or web browser in communication with a secured web server. The operator may receive the subscription key via the application or web browser, or the key may be sent to the operator via e-mail, text message, or the like. In other embodiments, the operator may contact a gaming machine manufacturer via other methods to obtain a subscription key, such as via a mail-in request, via telephone, etc. In further embodiments, the operator may access the web server to request the subscription key via the gaming machine. In this instance, the key may be relayed and input into the gaming machine automatically.

Figure 8:
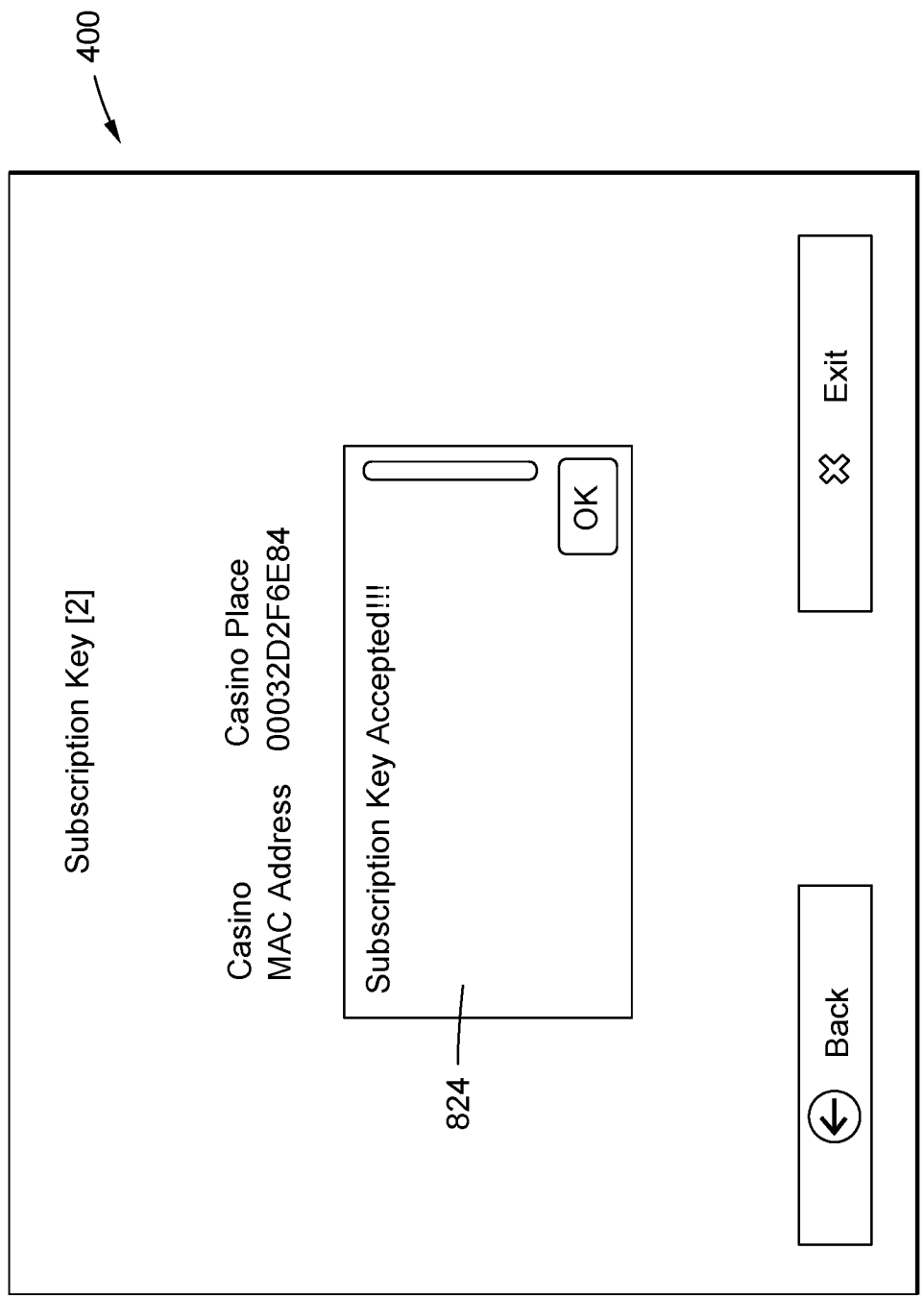
FIG. 8 shows a graphical user interface of an electronic player station when a subscription key is accepted.
Figure 9:
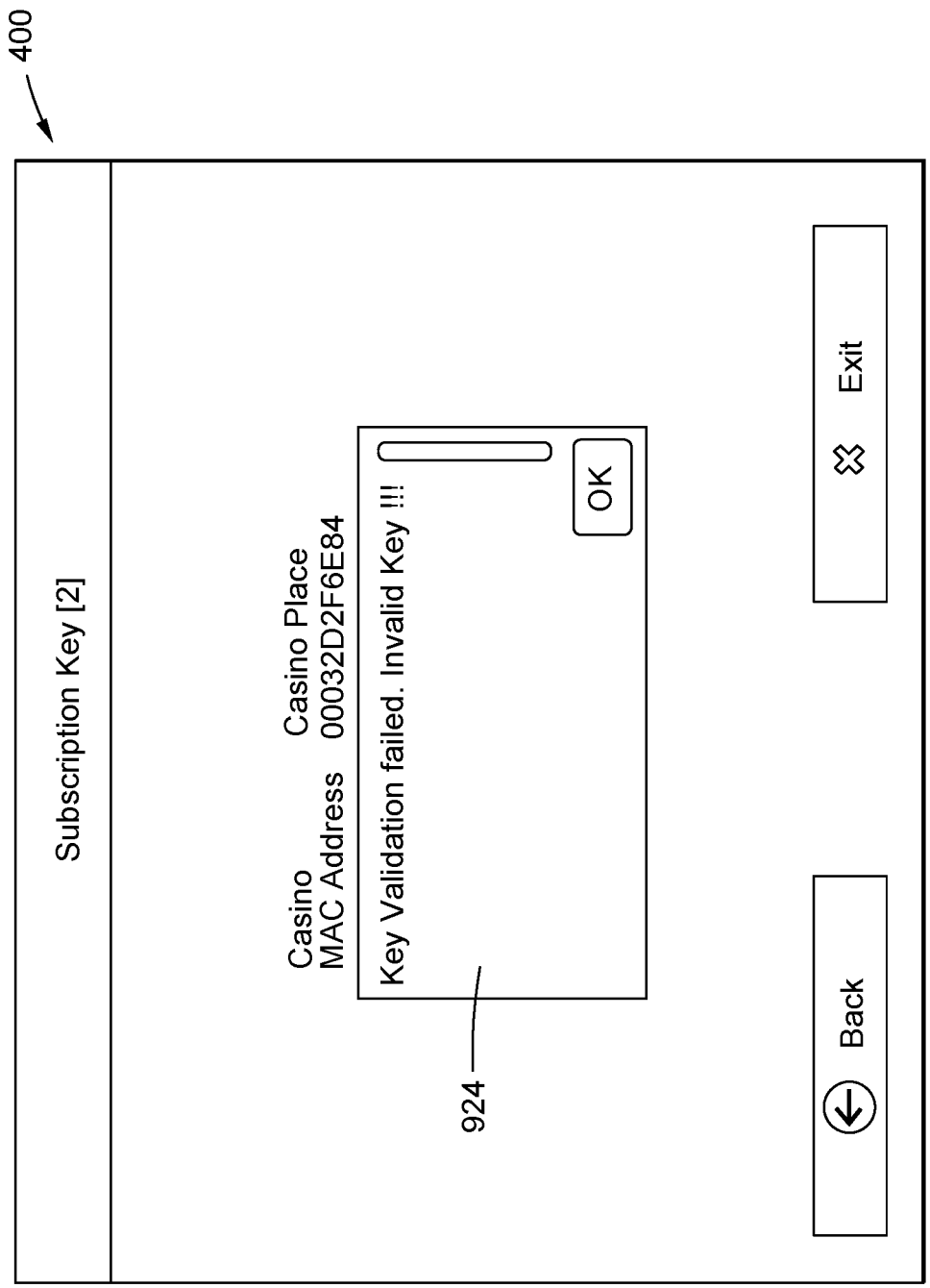
FIG. 9 shows a graphical user interface of an electronic player station when subscription key is denied.

FIG. 8 shows the GUI 400 when a subscription key is accepted. In this example, a message box 824 may be provided notifying the operator that the subscription key is accepted. FIG. 9 shows the GUI 400 when subscription key is denied. Here, the message box 924 may notify the operator that the subscription key is denied.

Figure 10:
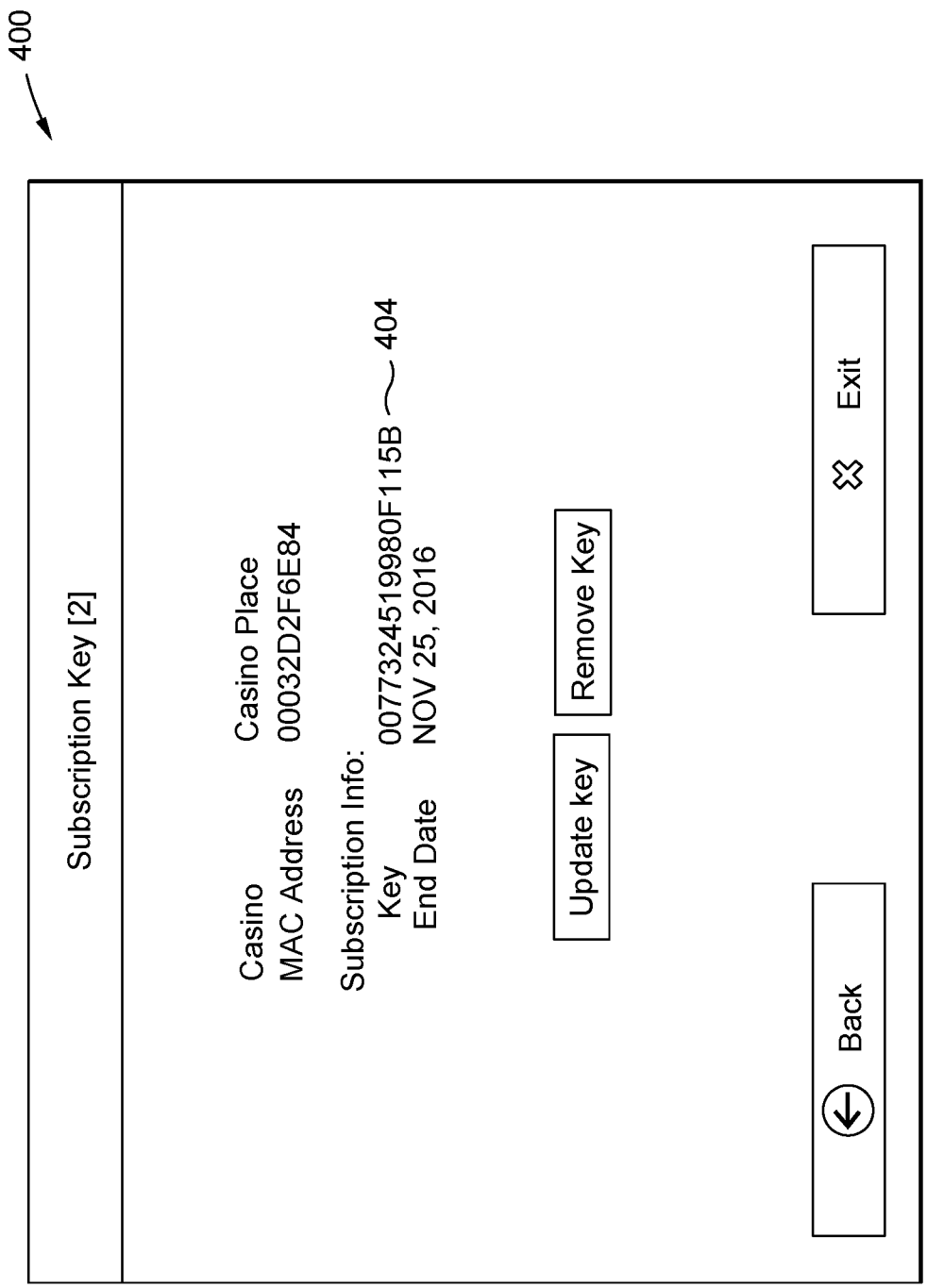
FIG. 10 shows a graphical user interface of an electronic player station after a successful key installation.

When a subscription key is successfully installed, the GUI 400 shows the new subscription key information 404. An example of an accepted subscription key is shown in FIG. 10.

Figure 11:
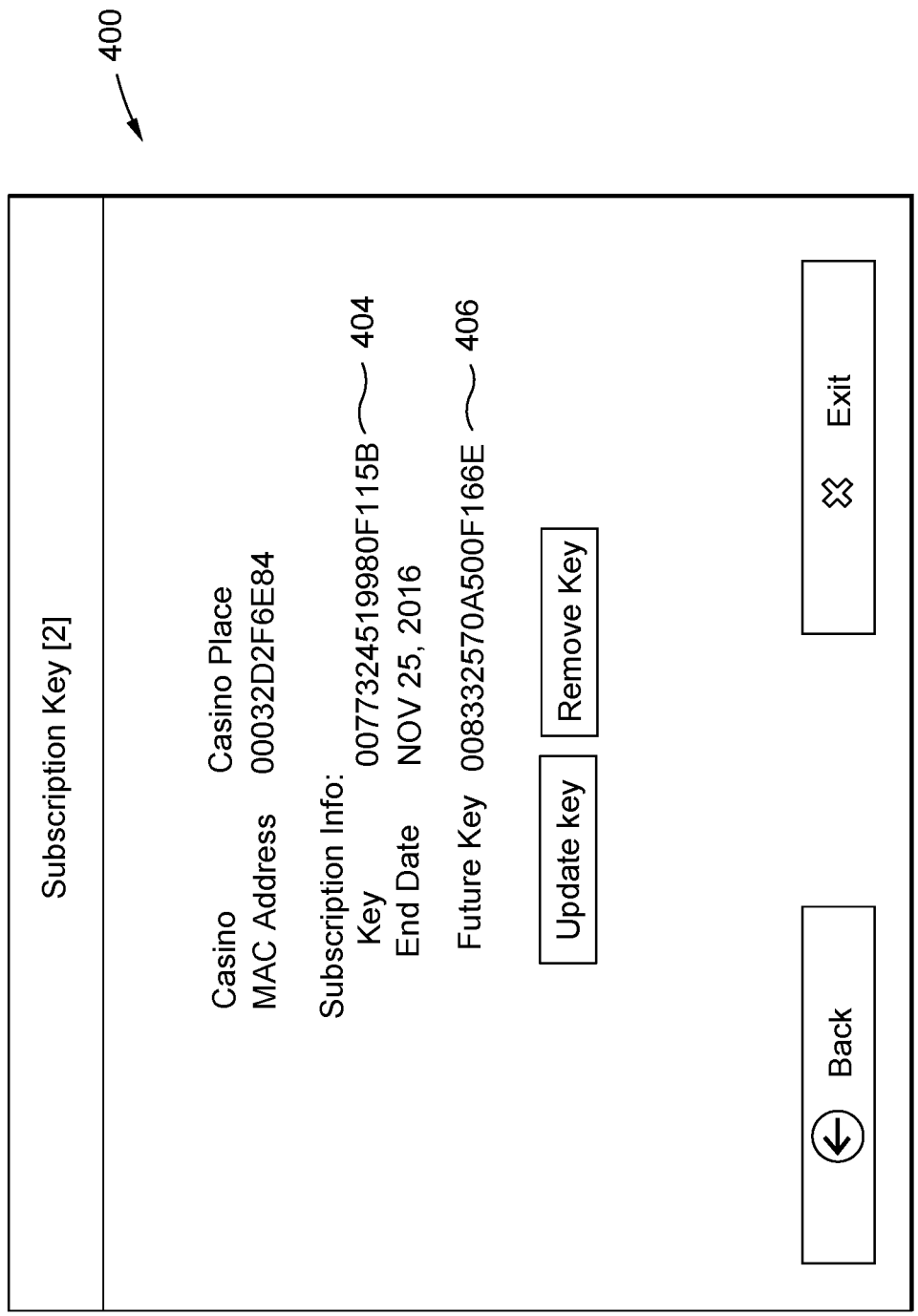
FIG. 11 shows a graphical user interface of an electronic player station showing subscription details.

As referenced above, a gaming establishment operator may also install a future key at a gaming machine. When a start date of a new key is after an end date of an existing key, it is considered a future key. Steps for adding a future key are similar to those described above. FIG. 11 shows an example of a GUI 400 where a future key 406 has successfully been installed.

Figure 12:
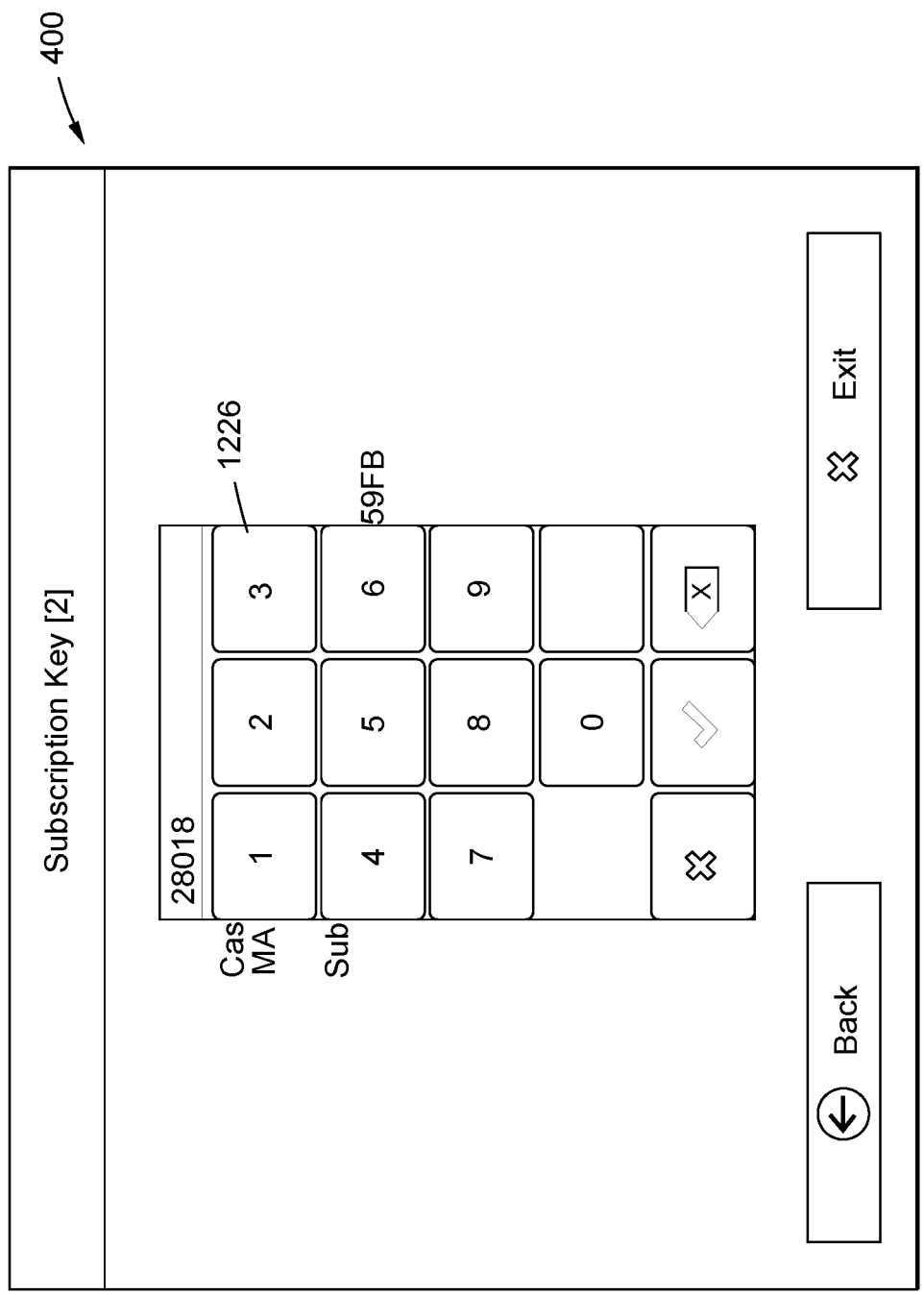
FIG. 12. shows a graphical user interface of an electronic player station with a keypad to remove a subscription key.

FIG. 12. shows a graphical user interface of an electronic player station with a keypad to remove a subscription key. As mentioned previously, in some embodiments a subscription key cannot be cleared using typical memory clear functionality. To remove a subscription key, a code may be required. As shown in FIG. 12, a keypad 1226 is provided on the GUI 400 to input a code to remove a subscription key.

Figure 13:
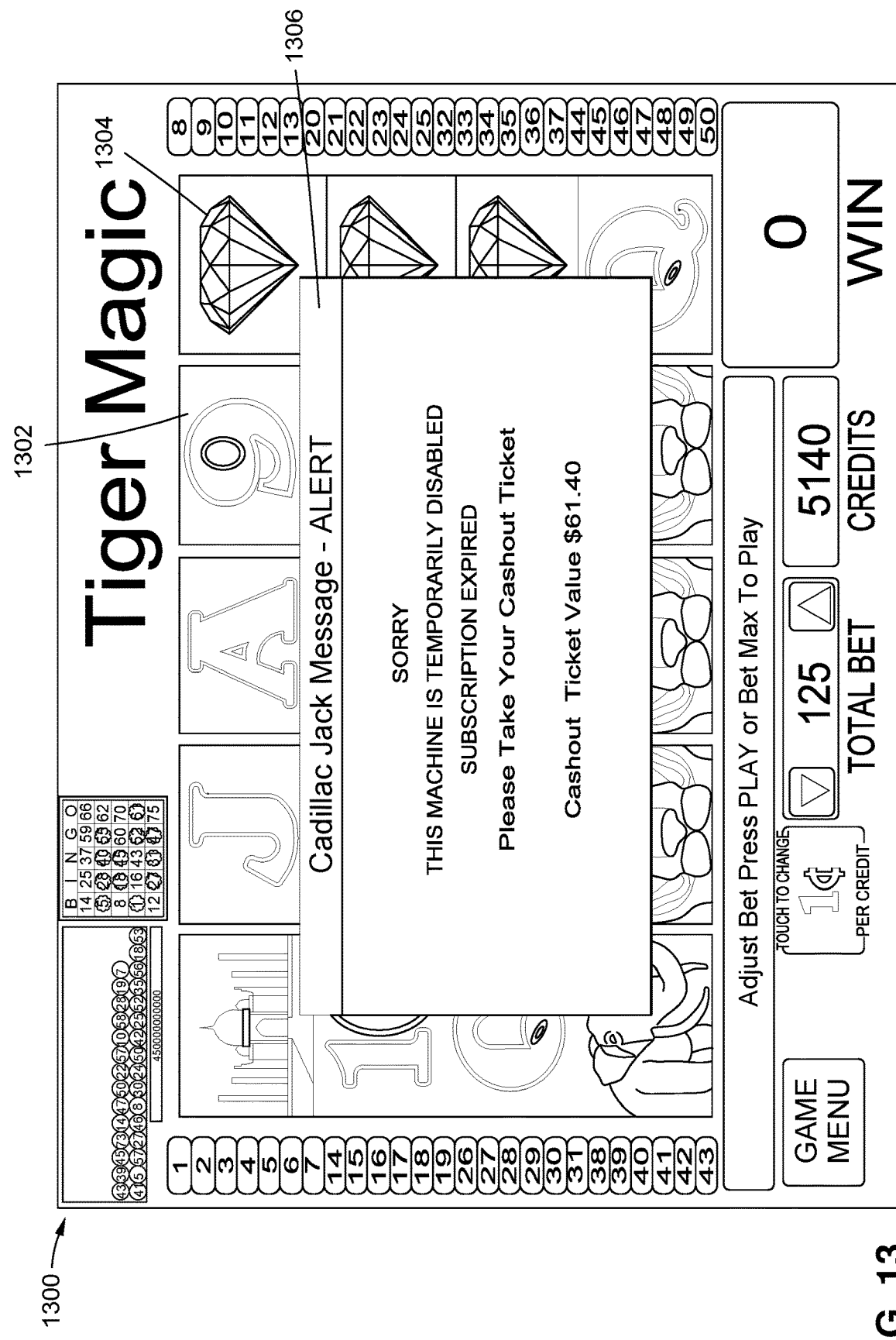
FIG. 13 shows a gaming machine display where a subscription key expires during play.
Figure 14:
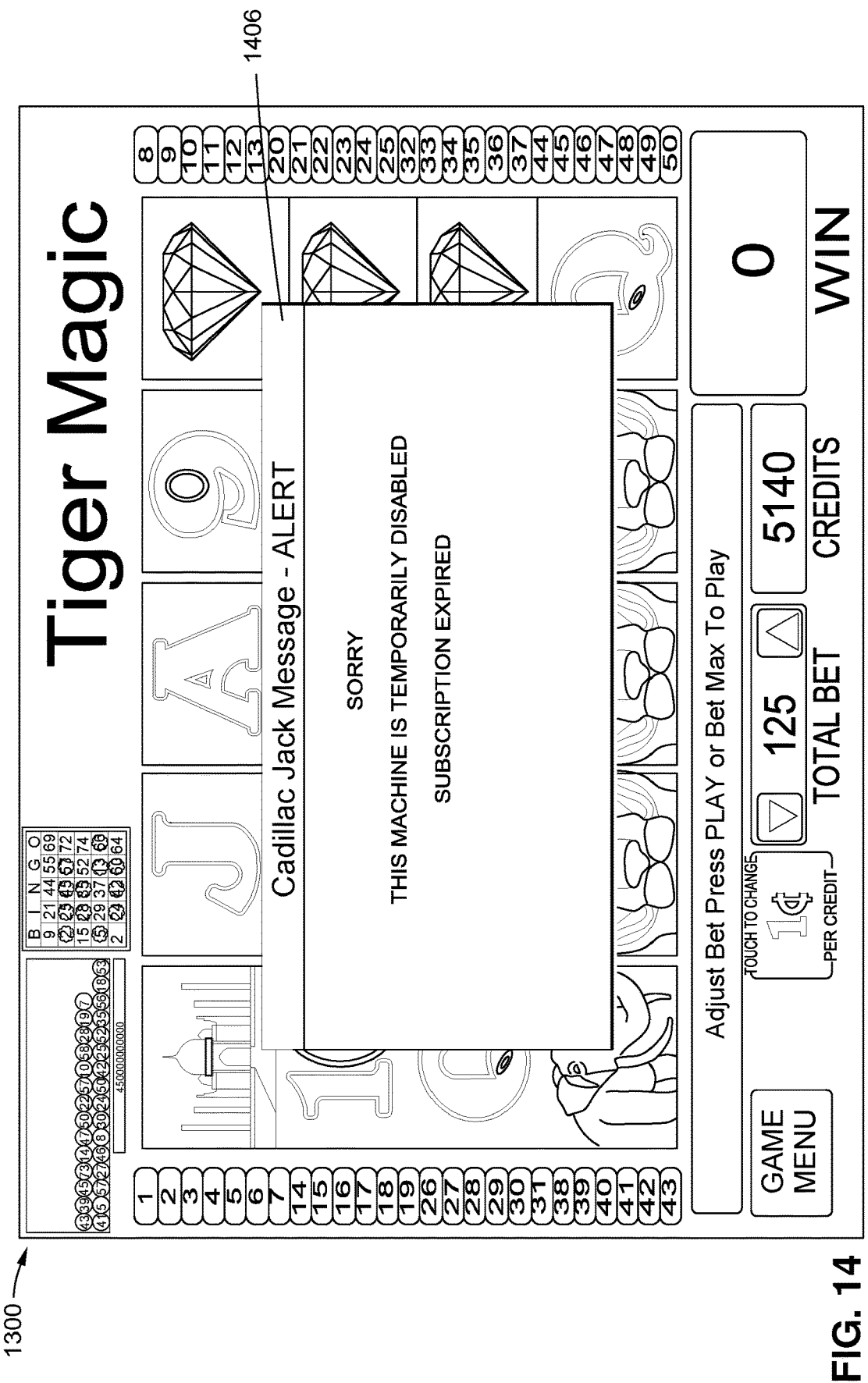
FIG. 14 shows a gaming machine display where an expired subscription key disables a game.

The subscription key allows game play to proceed at a gaming machine while the subscription key is valid and other requirements are met. FIG. 13 shows a gaming machine display where a subscription key expires during play. As shown in FIG. 13, a display screen 1300 shows an exemplary game at a gaming machine with columns 1302 of symbols 1304 used during game play. When a subscription key expires during game play, a pop-up alert window 1306 may be displayed on the screen 1300 notifying the player that the machine is disabled due to an expired subscription. Any credits on the machine may be automatically cashed out, such as by providing a cash out ticket to player. After any balance is on the machine is cashed out, the machine is placed in a disabled state, as shown in FIG. 14. For example, the display screen 1300 may show pop-up window 1406 indicating to players that the gaming machine is disabled.

Figure 15:
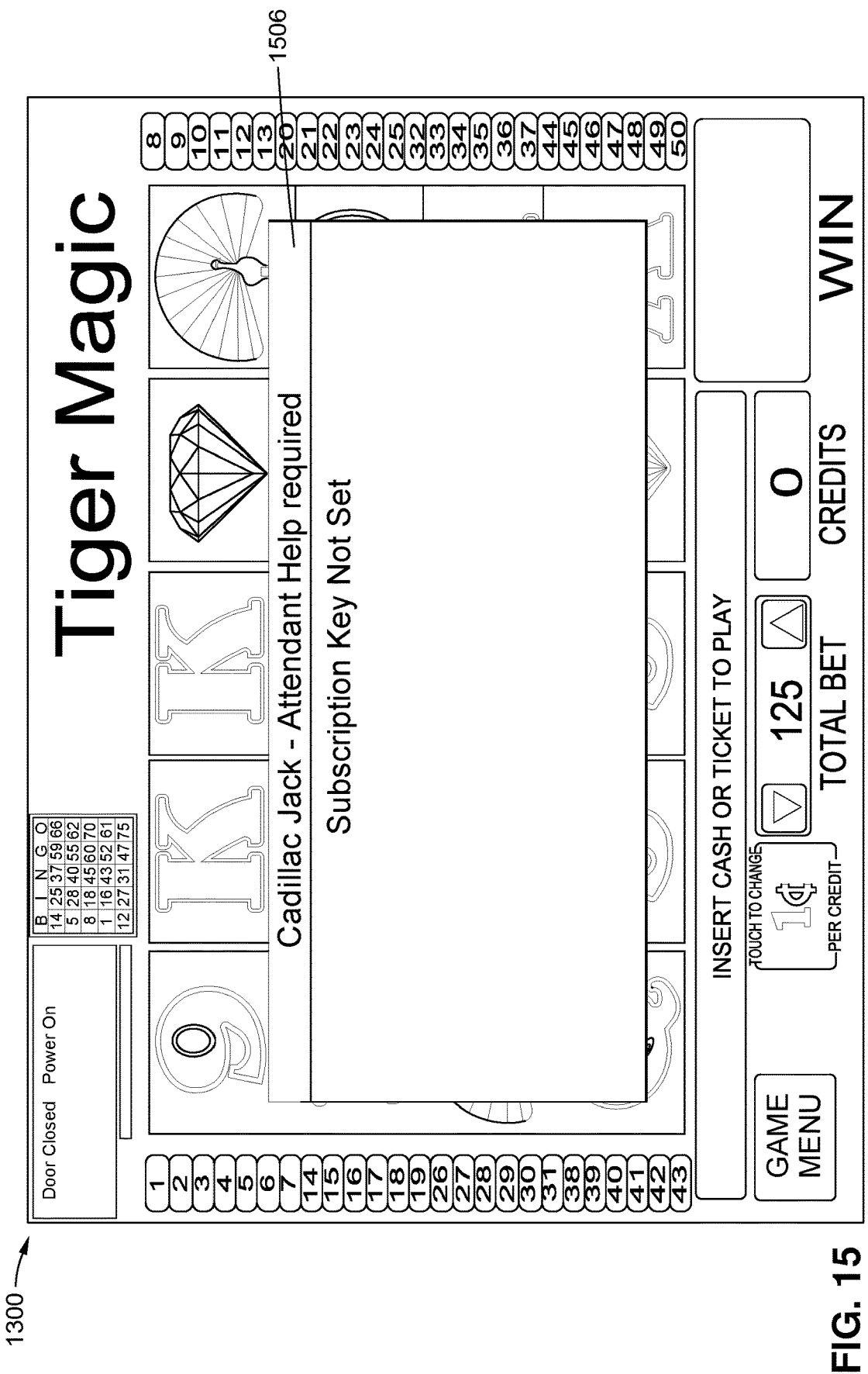
FIG. 15 shows a gaming machine display when no subscription key is present.

The display screen 1300 may also provide other indications to a player or gaming machine administrator to correct problems with a subscription. FIG. 15 shows a gaming machine display when no subscription key is present. In FIG. 15, the display screen 1300 includes a pop-up window 1506 indicating that no subscription key is set. In this case, the system has determined that there is no subscription key entered in the NVRAM. The alert may be cleared once a gaming establishment administrator enters a valid key, as described above.

Figure 16:
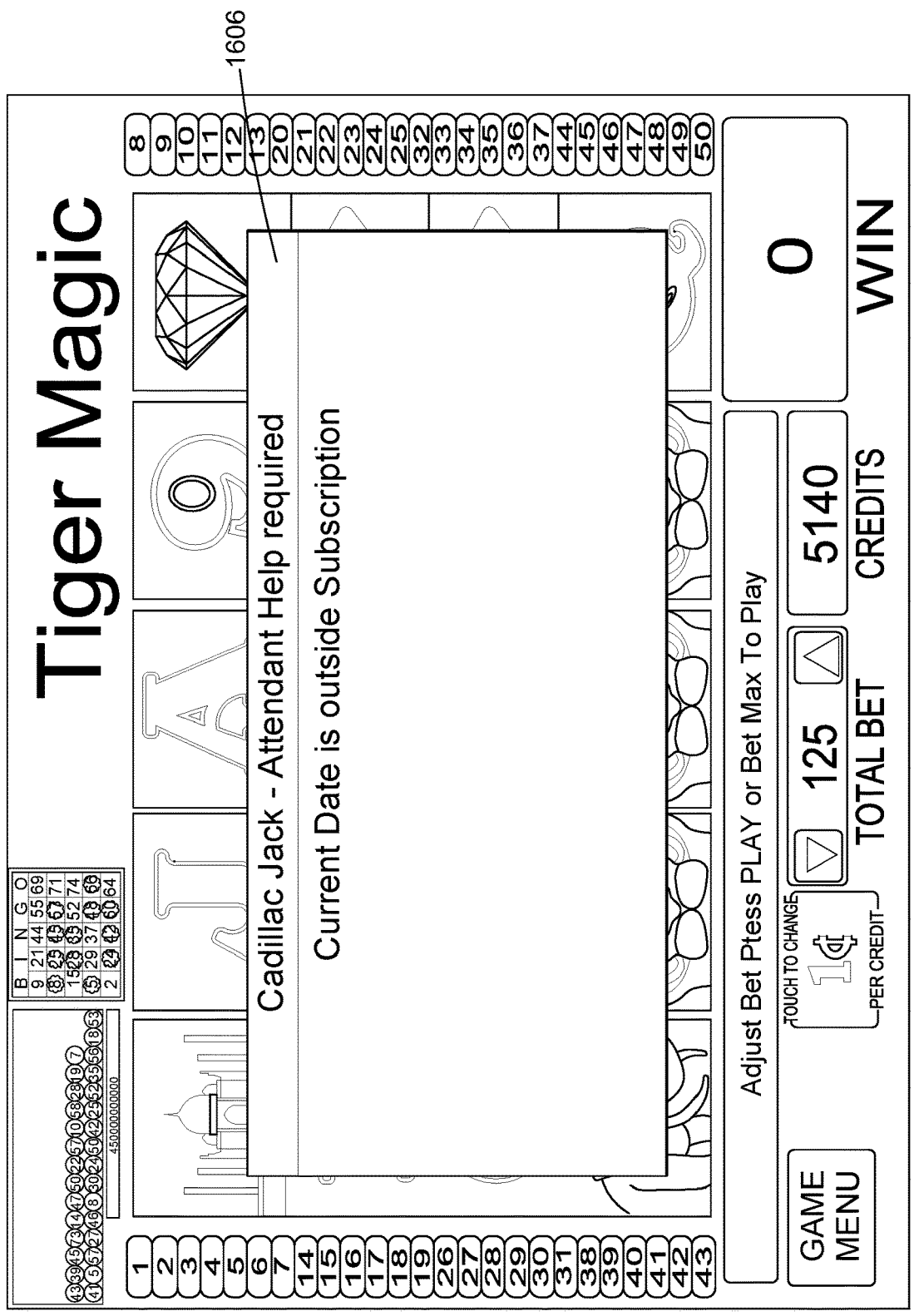
FIG. 16 shows a gaming machine display when a subscription start date is in the future.

FIG. 16 shows a gaming machine display when a subscription start date is in the future. During startup, a gaming machine checks and validates the subscription key. This includes ensuring that the current date is within the valid window based on the subscription start date and number of days the subscription is valid, as will be explained in more detail below. If the subscription start date is in the future, a display screen 1300 shows the pop-up alert window 1606 that the current date is outside of the subscription.

Figure 17:
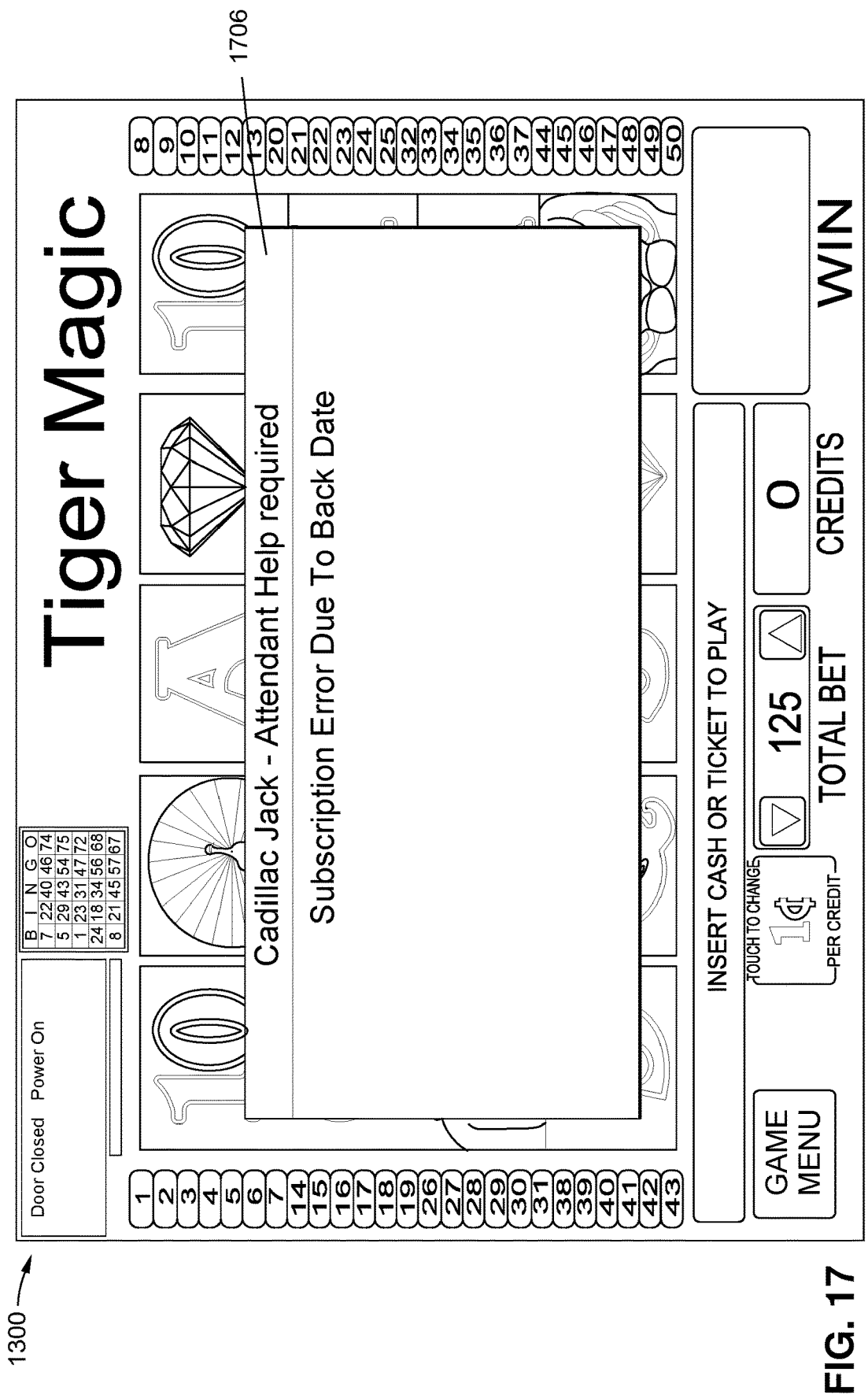
FIG. 17 shows a gaming machine display when a gaming machine date is moved backward over a prescribed limit.

Similarly, the system is designed to disable a gaming machine when a date adjustment outside a given range is detected. FIG. 17 shows a gaming machine display when a gaming machine date is moved backward over a prescribed limit. To limit fraud, the date on a gaming machine is monitored to detect tampering. If a date is moved backwards over a prescribed limit, then the gaming machine subscription is disabled. The display screen 1300 may show a pop-up alert window 1706 showing a back-date error has occurred. This error can be reset by setting the date back to within the expected range.

Figure 18:
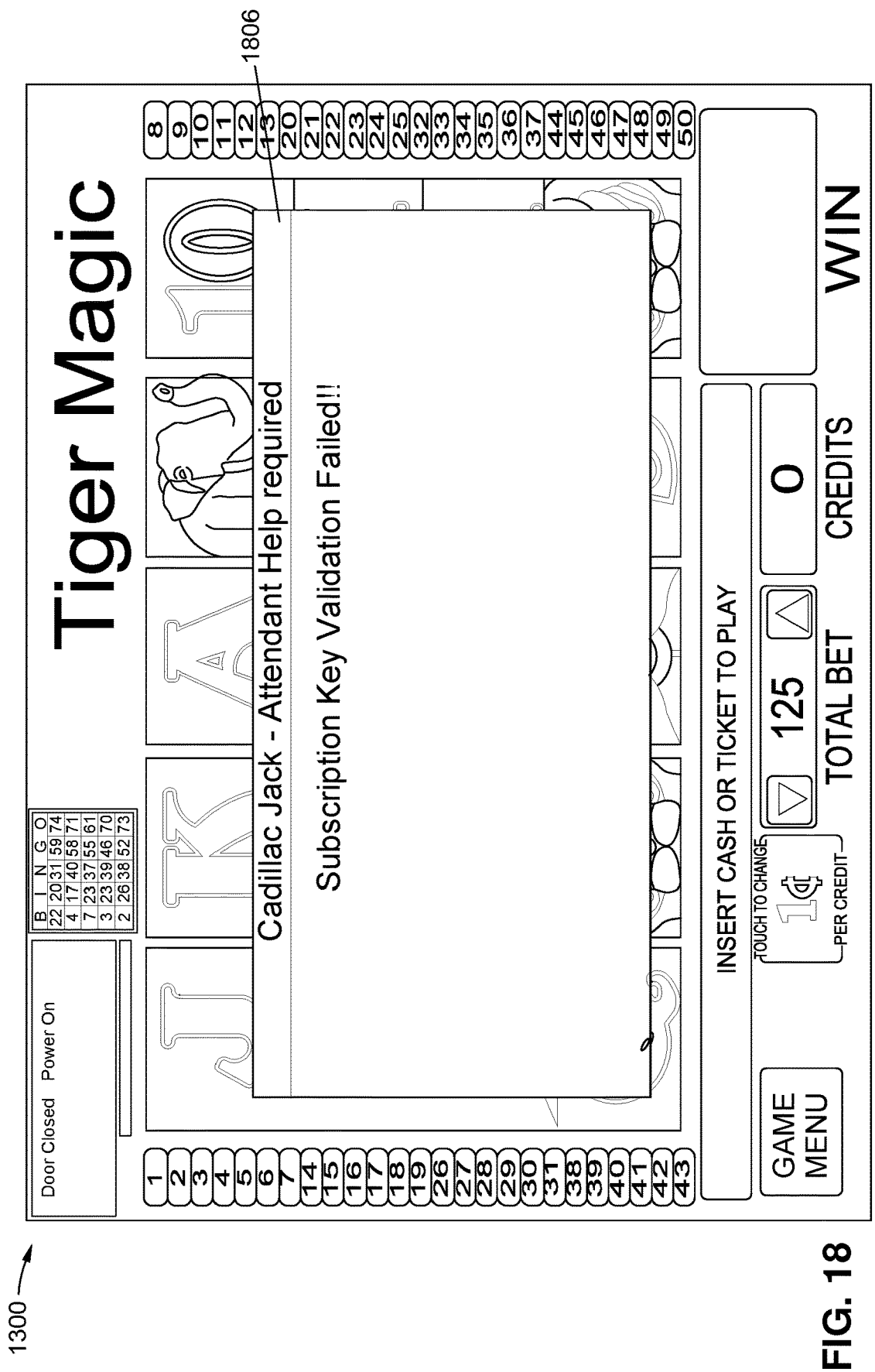
FIG. 18 shows a gaming machine display when a subscription validation key has failed.

Upon startup of a gaming machine, the system also checks that the current subscription key in the NVRAM is valid. When validation fails for any reason, such as change in a motherboard of the gaming machine, a display screen 1300 shows pop-up window 1806 identifying the validation failure, as shown in FIG. 18. In some embodiments, prior to a subscription expiring, the display screen 1300 may show a number of days remaining on a subscription without interrupting game play or disabling the gaming machine.

Figure 19:
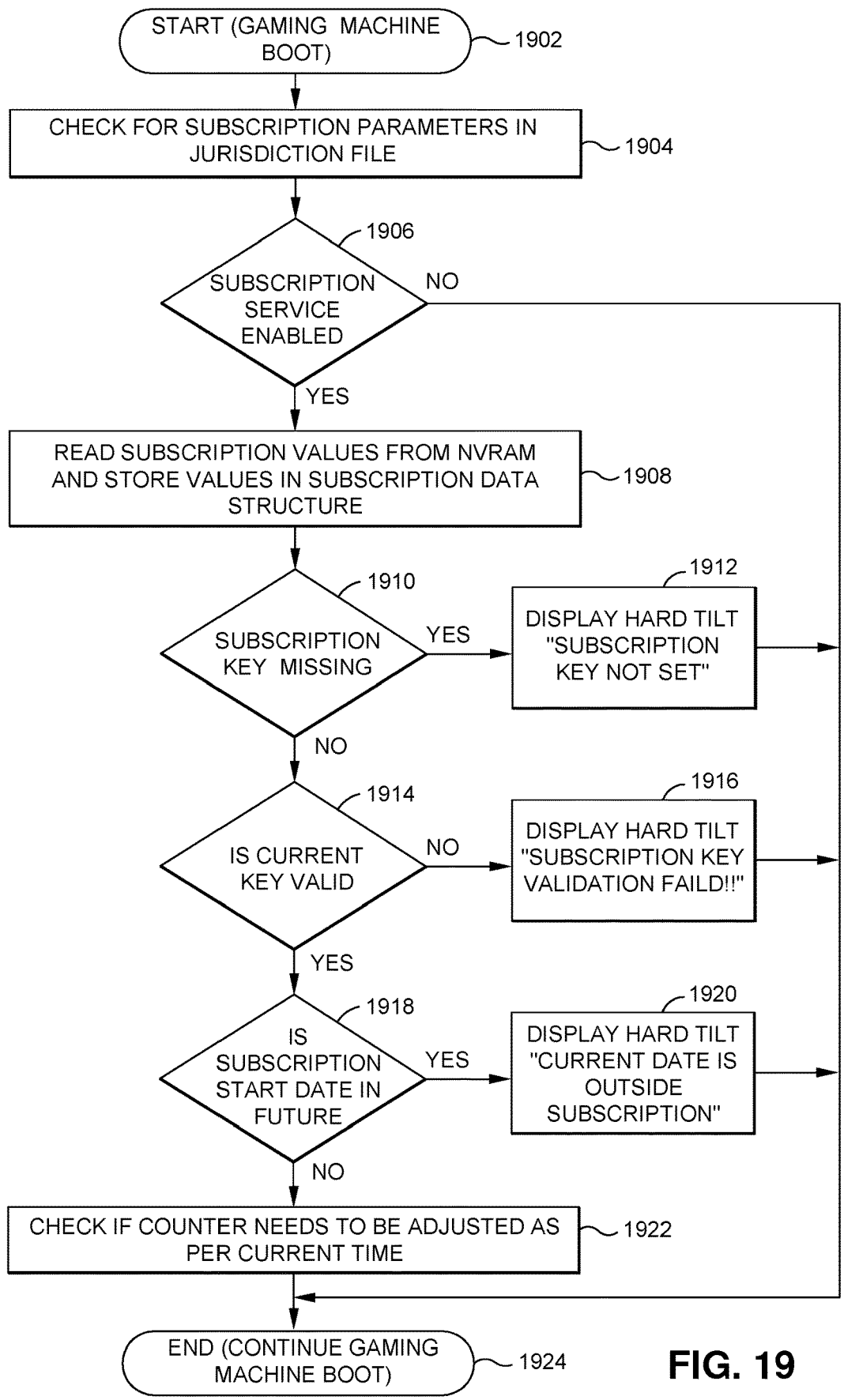
FIG. 19 shows a flow diagram for a method of booting an electronic player station with a subscription key, according to an exemplary embodiment.

FIG. 19 shows a flow diagram for a method of booting an electronic player station with a subscription key, according to an exemplary embodiment. In FIG. 19, a boot sequence of a gaming machine is initiated in step 1902. In step 1904, the method checks for subscription parameters in a jurisdiction file (the subscription parameters may comprise data which controls or determines whether access to the gaming machine and/or software on the gaming machine is controlled by a subscription service, etc.). In step 1906, if the subscription service is not enabled, the gaming machine continues the boot sequence in step 1924. When the subscription service is enabled in 1906, the process continues to step 1908.

A jurisdiction file, such as the one described above which may include subscription parameters and other information which is used by the gaming machine to configure itself for use in a particular jurisdiction and in compliance with the regulations of a particular jurisdiction, is preferably installed onto a separate read-only non-volatile memory associated with the gaming machine, such as the NVRAM 52 or a separate compact flash memory, by the manufacturer at the time of product release or as needed when new jurisdictional requirements are implemented (e.g. when the file needs to be updated to enable compliance with the regulations or requirements of the jurisdiction (city, county, state, country, etc.) where the gaming machine is being operated or to otherwise implement a different configuration for the gaming machine for the jurisdiction). This file may be installed onto the gaming machine at the time of a NVRAM clear, prior to any game control or configuration options being checked (and once installed on to the read-only memory, thus can't be modified, thus ensuring it remains secure). This NVRAM clear is typically done at the time of the installation of the gaming machine, but can be performed at other times as needed by the casino (installation of new title, critical game lockup, etc.).

In step 1908, the gaming machine runs a subscription service function to read subscription values from the subscription key stored in the NVRAM on the gaming machine. The values are stored in a subscription data structure in a memory to validate the subscription key information. In step 1910, the system checks the values to determine whether a subscription key is missing. If so, in step 1912, the system displays a hard tilt "subscription key not set" on the display screen and continues the boot sequence in step 1924. If not, then the process proceeds to step 1914.

In step 1914, the system determines whether the subscription key is valid. For example, the gaming machine sends subscription data from the subscription key to a webserver which validates the key based on the key parameters described above. In another example, software on the gaming machine may validate the subscription key by parsing the subscription key and extracting the subscription parameters. For example, the software extracts the number of days, the subscription start-date, the key generation date time, and the CRC. The gaming machine software then calculates the CRC based on one or more of the extracted parameters, the gaming machine MAC address, and the secret string encoded in the gaming machine software. If the CRC matches, then the key is valid. If the key is not valid, the system displays a hard tilt "subscription key validation failed!" in step 1916 and continues the boot sequence in step 1924. If the key is valid, the process proceeds to step 1918.

In step 1918, the system determines whether the subscription key has a start date in the future. If so, the system displays hard tilt "current date is outside subscription" in step 1920 and continues the boot sequence in step 1924. If not, the process proceeds to step 1922.

In step 1922, the system ensures that the counter is adjusted according to the current time to step down an amount of valid days remaining on the subscription. For example, if a gaming machine is shut down for multiple days, the system ensures that the counter is adjusted based on the current date. The process then proceeds to step 1924 to continue a boot sequence of the gaming machine.

Figure 20:
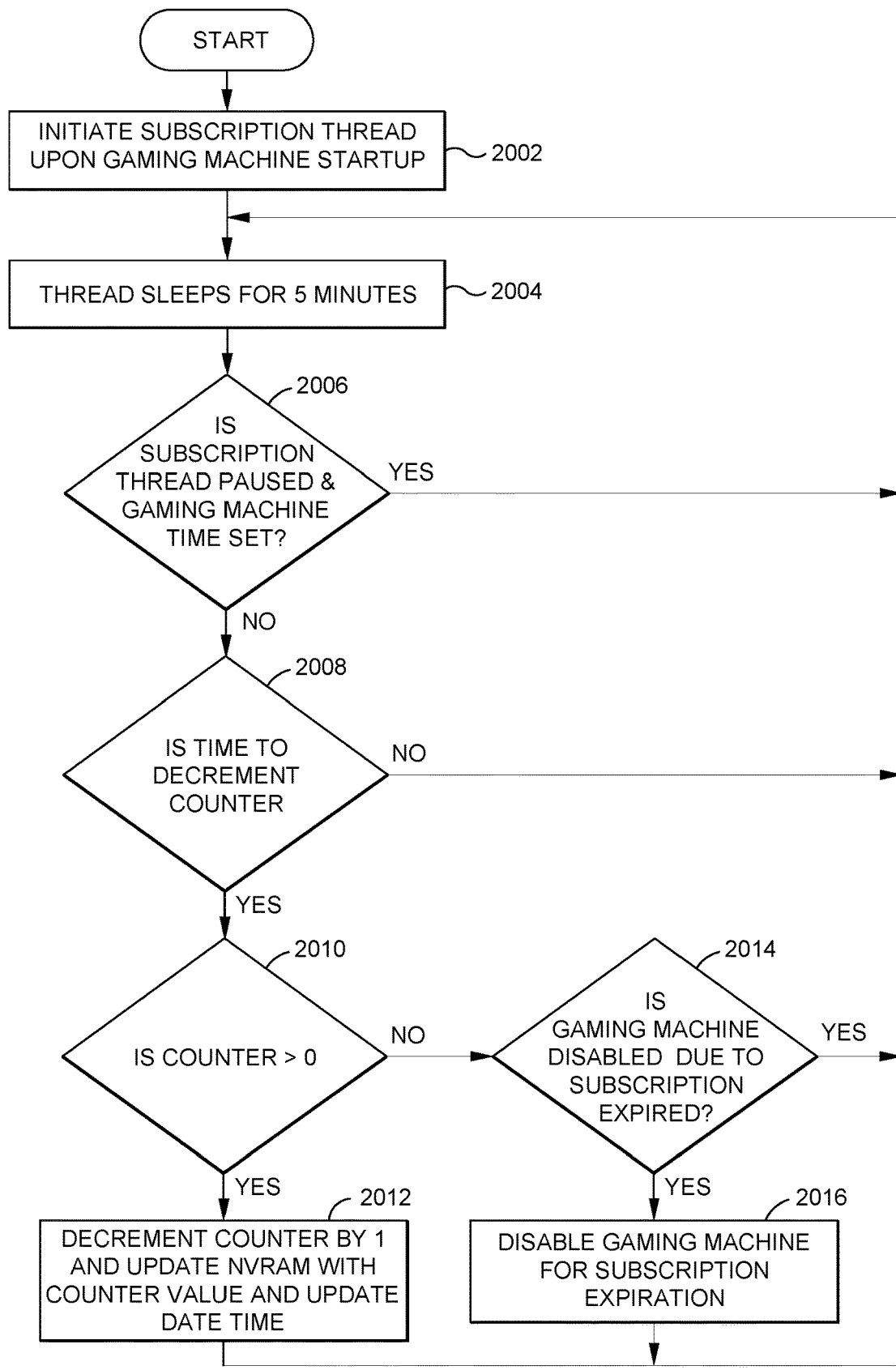
FIG. 20 shows a flow diagram for a method of updating a subscription counter, according to one exemplary embodiment.

FIG. 20 shows a flow diagram for a method of updating a subscription counter, according to one exemplary embodiment. In step 202, a gaming machine initiates a subscription thread upon gaming machine startup. The subscription thread may be a routine encoded in software on the gaming machine which is executed periodically to validate and update a subscription at the gaming machine. In step 2004, the subscription thread is set to sleep for five minutes. The time interval may be more or less than five minutes depending on how often the subscription key should be checked in a given application.

In step 2006, the gaming machine determines whether the subscription thread is currently paused and that the gaming machine time is set. If so, the process reverts to 2004 until subscription thread comes out of sleep. In step 2008, the system determines whether it is time to decrement a subscription counter. If so, the process continues to step 210. If it is not time to decrement the counter in step 2008, the process returns to step 2004.

In step 2010, the gaming machine checks if the counter is greater than zero. If so, the process proceeds to step 2012 and the counter is decremented by 1 and the NVRAM, such as NVRAM 52 (see FIG. 1B), is updated with a counter value and an updated date and time value. In one example, if the gaming machine date has advanced, then the gaming machine decrements the counter and updates the NVRAM. In other embodiments, if the gaming machine time is within a certain range, then the gaming machine decrements the counter.

If in step 2010, the counter is not greater than zero, the process proceeds to step 2014. In step 2014, the gaming machine subscription thread routine checks if the gaming machine and/or one or more games on the gaming machine is disabled due to the subscription expiring. If the gaming machine and/or the one or more games are already disabled, the process returns to step 2004. If not, then the process proceeds to step 2016 and the gaming machine and/or one or more games are disabled for an expired subscription. The process then returns to step 2004.

Figure 21:
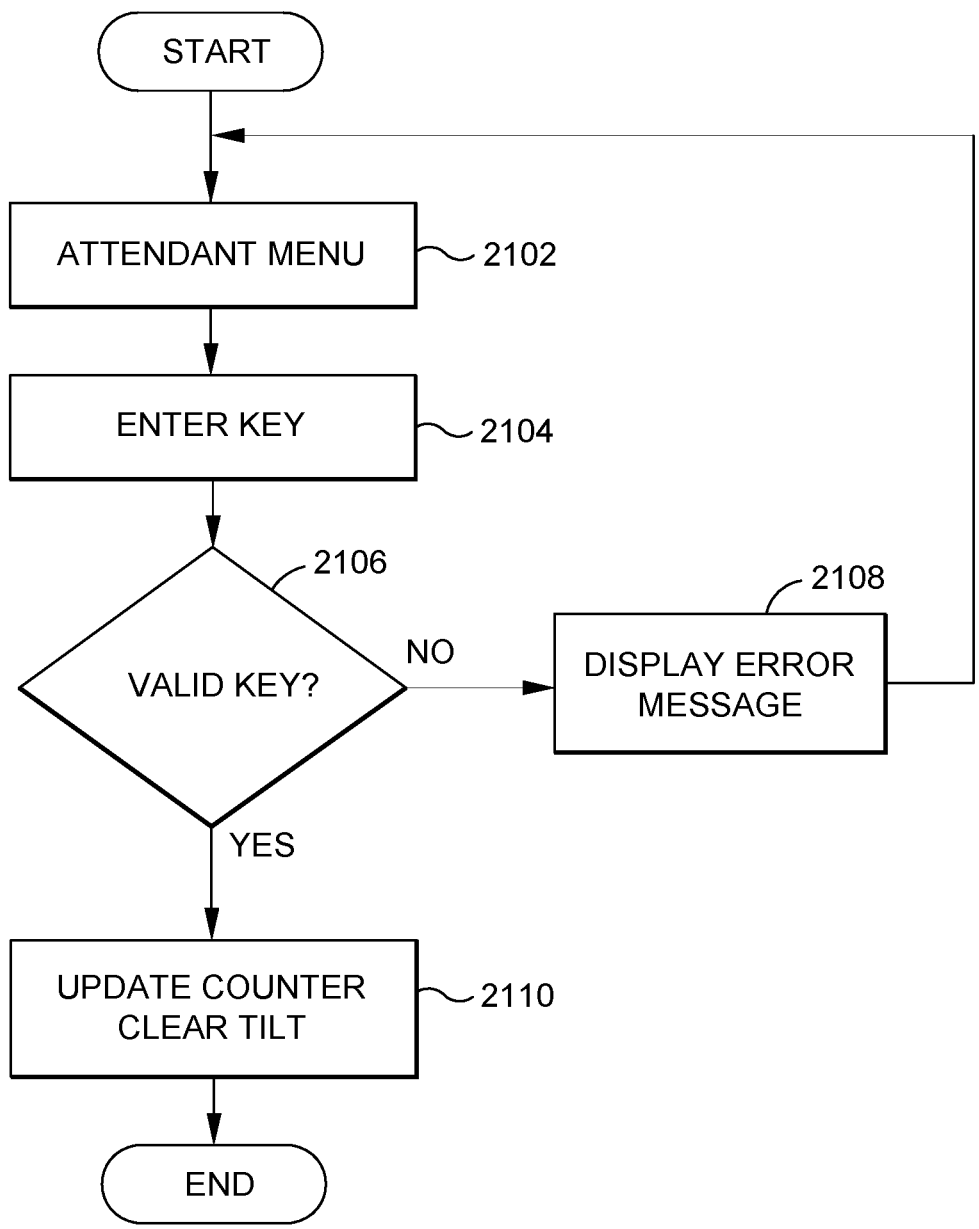
FIG. 21 shows a flow diagram for installing a subscription key, according to one exemplary embodiment.

FIG. 21 shows a flow diagram for installing a subscription key, according to one exemplary embodiment. As explained above, to enable a gaming machine or a game installed on a gaming machine, a subscription key is required and is entered at the gaming machine. To enter the subscription key, the operator accesses an attendant menu in step 2102. The attendant menu includes an option to enter a subscription key. Upon choosing the option, the operator enters the key in step 2104.

The gaming machine checks to determine that the key is valid in step 2106. For example, the gaming machine may contact a web server to validate the subscription key. In another embodiment, the gaming machine software extracts parameters from the subscription key and validates the key using a secret string to check for a correct value, as described above. If the subscription key is not valid, an error message is displayed in step 2108. The operator is then taken back to the menu where another key may be entered if desired. If the subscription key is valid, the counter of remaining authorized time is updated according to the key information, and any previous errors or TILTs are cleared so that the gaming machine or game is enabled for play.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A computer-implemented method of generating a subscription key which controls access to a gaming machine, the method implemented via at least one server comprising a controller, a memory and machine-readable code stored in the memory and executable by the controller, the method comprising the steps of:

receiving, from a user via at least one user input device to said at least one server, a first input at said controller for a subscription term and said machine-readable code causing said controller to output a first string based on the subscription term;

receiving, from said user via said at least one user input device to said at least one server, a second input at said controller for a subscription start date and said machine-readable code causing said controller to output a second string based on the subscription start date;

receiving a third input at said controller for a key generation date and time and said machine-readable code causing said controller to output a third string based on the key generation date and time;

generating a fourth input at said controller, said fourth input comprising a cyclical redundancy check value generated via a cyclical redundancy operation implemented by said controller using as value inputs thereto a MAC address of the gaming machine and at least one of the first input, the second input and an additional parameter, said machine-readable code causing said controller to output a fourth string based upon said fourth input;

generating, via said controller, said subscription key to control access to said gaming machine, said subscription key comprised of the first, second, third, and fourth strings, said subscription key comprising data readable by a processor of said gaming machine from which parameters of said subscription key, including said subscription start date, term, key generation date and cyclical redundancy check value are extractable;

receiving, at said gaming machine, said subscription key;

extracting, via the processor of the gaming machine, parameters from the subscription key, the parameters including the subscription start date, the subscription term, the key generation date, and the cyclical redundancy check;

generating, by the processor of the gaming machine, a local cyclical redundancy check value based on a MAC address of the gaming machine and one or more of the extracted parameters;

validating, by the processor of the gaming machine, the subscription key, the validating comprising comparing the local cyclical redundancy check value to the cyclical redundancy check value extracted from the subscription key; and controlling, via the processor of the gaming machine, access to the operation of the gaming machine based upon the comparison of the cyclic redundancy check value extracted from the subscription key and the local CRC generated using the MAC address and the one or more parameters extracted from the subscription key.

2. The method of claim 1, wherein the step of generating further comprises:

generating, via said controller, an initial subscription key comprised of the first, second, third, and fourth strings in an initial ordering of characters; and generating, via said controller, said subscription key by scrambling the initial ordering of characters of the initial subscription key.

3. The method of claim 2, wherein scrambling initial ordering of characters of the initial subscription key comprises selecting increments of two characters of the initial subscription key.

4. The method of claim 1, wherein the first, second, third, and fourth strings are hexadecimal strings.

5. The method of claim 4, wherein the first string is a four-digit hexadecimal string representing a number of days based on the subscription term.

6. The method of claim 4, wherein the second string is a four-digit hexadecimal string representing a day of year and a two-digit year value based on the subscription start date.

7. The method of claim 4, wherein the third string is a six-digit hexadecimal string representing a day of year followed by the hours and minutes of the key generation date and time.

8. The method of claim 4, wherein the fourth string is a four-digit hexadecimal string that is further based on the subscription start date, the subscription term, and a pre-coded secret string to generate a cyclical redundancy check value.

9. The method of claim 1 further comprising:

storing the received subscription key a non-volatile random access memory of the gaming machine.

10. The method of claim 9 wherein the subscription key is stored in a first block of the non-volatile random access memory.

11. The method of claim 1 where the fourth input is received after the third input which is received after the second input which is received after the first input.

12. The method of claim 1 further comprising the step of validating said subscription key via said processor of said gaming machine, said processor configured to execute machine readable instructions fixed in a tangible medium.

13. The method of claim 1 wherein said subscription key is received at said gaming machine via user input to an input device of said gaming machine.

14. The method of claim 13, where said input device comprises a touch-screen displaying a hexadecimal keypad.

15. The method of claim 1, wherein said step of controlling access comprises preventing access to the operation of the gaming machine when said subscription key is not validated in said validating step.

* * * * *